United States Patent
Aritomi et al.

(10) Patent No.: US 7,847,980 B2
(45) Date of Patent: Dec. 7, 2010

(54) IMAGE PROCESSING APPARATUS AND IMAGE PROCESSING METHOD

(75) Inventors: Masanori Aritomi, Shinjuku-ku (JP); Yasuhiro Kujirai, Ohta-ku (JP); Hiroshi Oomura, Yokohama (JP); Tatsuro Uchida, Yokohama (JP); Yoshihiro Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1191 days.

(21) Appl. No.: 11/037,717

(22) Filed: Jan. 18, 2005

(65) Prior Publication Data

US 2005/0162682 A1   Jul. 28, 2005

(30) Foreign Application Priority Data

Jan. 23, 2004  (JP)  ............................. 2004-016399
Nov. 12, 2004  (JP)  ............................. 2004-329700

(51) Int. Cl.
   *H04N 1/405* (2006.01)
(52) U.S. Cl. .................. 358/3.28; 358/1.1; 358/1.2; 358/1.9; 358/2.1; 358/3.1; 358/3.09; 399/366
(58) Field of Classification Search .................. 358/1.1, 358/1.4, 1.9, 2.1, 3.01, 3.06, 3.09, 3.28, 400, 358/500; 283/72, 73, 74, 902, 113; 399/366
   See application file for complete search history.

(56) References Cited

U.S. PATENT DOCUMENTS

| | | | | |
|---|---|---|---|---|
| 5,197,765 | A * | 3/1993 | Mowry et al. ................. | 283/93 |
| 5,788,285 | A | 8/1998 | Wicker | |
| 6,000,728 | A * | 12/1999 | Mowry, Jr. .................... | 283/93 |
| 6,396,927 | B1 * | 5/2002 | Phillips ........................ | 380/54 |
| 7,274,890 | B2 * | 9/2007 | Uchida et al. ................. | 399/81 |
| 7,450,895 | B2 * | 11/2008 | Oomura et al. ............. | 399/366 |
| 2002/0033966 | A1 * | 3/2002 | Lee et al. .................... | 358/3.01 |
| 2003/0020973 | A1 * | 1/2003 | Kondo ........................ | 358/518 |
| 2003/0179412 | A1 * | 9/2003 | Matsunoshita ............. | 358/3.28 |
| 2004/0021311 | A1 * | 2/2004 | Shimada et al. ............... | 283/72 |
| 2004/0051885 | A1 * | 3/2004 | Matsunoshita .............. | 358/1.9 |
| 2004/0114190 | A1 * | 6/2004 | Man .......................... | 358/3.28 |
| 2005/0088672 | A1 * | 4/2005 | Johnson ...................... | 358/1.9 |

FOREIGN PATENT DOCUMENTS

JP   2001-197297 A   7/2001

(Continued)

*Primary Examiner*—Twyler L Haskins
*Assistant Examiner*—Kent Yip
(74) *Attorney, Agent, or Firm*—Canon U.S.A. Inc., I.P. Division

(57) ABSTRACT

An image processing apparatus performs a density adjustment process for generating an image containing a copy-forgery-inhibited pattern image for warning against the use of copy products. To help users to easily adjust the density of a latent image portion and a background portion in the copy-forgery-inhibited pattern image, the image processing apparatus determines a density relationship of the latent image portion and the background portion by performing a plurality of adjustment operations, in combination, different in the amount of adjustment relating to the range of variable density in at least one of the latent image portion and the background portion, and sets, based on the density relationship, the density data of each of the latent image portion and the background portion in the data of the copy-forgery-inhibited pattern image.

6 Claims, 20 Drawing Sheets

FOREIGN PATENT DOCUMENTS

| | | |
|---|---|---|
| JP | 2001-238075 A | 8/2001 |
| JP | 2004-304597 A | 10/2004 |
| JP | 2005-130114 A | 5/2005 |
| JP | 2005-130115 A | 5/2005 |
| JP | 2005-130116 A | 5/2005 |

* cited by examiner

- 2201 STYLE DETAIL
- 2202 STYLE LIST: COPY INHIBITED / VOID / COPY
- 2203 ADD(D) / DELETE
- 2204 STYLE NAME(N): VOID
- 2205 LOGO TYPE: ● CHARACTER STRING / ○ IMAGE
- 2206 TEXT: VOID
- 2207 FONT(F): MS MINCHO
- 2208 SIZE(Z): INTERMEDIATE
- 2209 PRINT METHOD(P): ● WATERMARK PRINTING / ○ OVERLAP PRINTING
- 2210 OK / CANCEL / HELP(H)
- 2211 ANGLE(G): ● RIGHT UPWARD ANGLE / ○ RIGHT DOWNWARD ANGLE / ○ HORIZONTAL
- 2212 COLOR(C): BLACK
- 2213 OUTLINED
- 2214 BACKGROUND PATTERN

IMAGE PROCESSING APPARATUS AND IMAGE PROCESSING METHOD

BACKGROUND OF THE INVENTION

1. Field of the Invention

The present invention relates to an image processing apparatus and an image processing method and, more particularly, to a density adjustment process for generating an image composed of a copy-forgery-inhibited pattern image for warning against the use of copy products in an image processing system including an image processing apparatus, such as a computer, and a printer.

2. Description of the Related Art

Forgery-inhibited sheets having a special print pattern are used for forms and resident cards to inhibit or restrain copying. If a forgery-inhibited sheet is copied on a copying apparatus, a resulting sheet will bear the word "COPY", for example, although the word on the original sheet is less visible to the human eyes. In this way, the original print sheet and the copy product thereof are distinctly discriminated. The use of the forgery-inhibited sheets causes any person to hesitate to use the copy product. Furthermore, the use of the forger-inhibited sheets psychologically warns persons against copying the original sheet. To distinctly discriminate between the original and the copy product, the character string on the original forgery-inhibited sheet is made less visible to the human eyes. If the character string "COPY" on the original sheet is clearly recognizable, the original can be identified as a copy product, and the forgery-inhibited sheet cannot function as an original.

Techniques for manufacturing such forgery-inhibited sheets are disclosed in U.S. Pat. No. 5,788,285 granted to Wicker and U.S. Pat. No. 6,000,728 granted to Mowry et al.

Such forgery-inhibited sheets, produced using a special printing technique, are costlier than standard commercial sheets of paper. A character that emerges on a copy product can be set on the forgery-inhibited sheet during manufacture only. The application of the forgery-inhibited sheet and the character string are thus subject to limitations. The convenience of manufacture is assured at the expense of flexibility of the known forgery-inhibited sheets in applications.

Contents, such as forms and resident cards, are also handled as digital data as more and more contents become digital. However, the introduction of digital techniques into the forms and resident cards is still at a transitional phase thereof. As a result, contents in the form of computer-generated digital data are still typically printed on sheets of paper on a printer.

long with the rapid advance of printing performance, several techniques draw attention. In one technique, a sheet having the same effect as the known forgery-inhibited sheet is printed on-demand on a system of a computer and a printer. Japanese Patent Laid-Open No. 2001-197297 and Japanese Patent Laid-Open No. 2001-238075 disclose techniques in which copy-forgery-inhibited pattern images are superimposed on the background of computer-generated content data when the content data is printed using a printer. The copy-forgery-inhibited pattern image on an original (printed matter output from the printer) looks like a mere pattern or a mere background color to the human eyes. When the original is copied, a predetermined character emerges on a resulting copy product. This arrangement induces the same effect as the forgery-inhibited sheet on a forger.

When a computer-generated copy-forgery-inhibited pattern image is superimposed, standard print sheets of paper can be used. For this reason, this technique provides cost advantages over the forgery-inhibited sheet. During printing of content, a copy-forgery-inhibited pattern image can be produced. A character that is developed during copying is flexibly set. Dynamic information including the name of a user who has performed a print job and output date and time is designed to emerge as a character string.

As described above, a copy-forgery-inhibited pattern image such as a predetermined character, which is invisible prior to copying, emerges on a copy product, restrains the use of the copy product, and allows any persons to distinctly recognize that the sheet is a copy product not the original. To achieve this effect, the copy-forgery-inhibited pattern image includes two areas. In one area, an image remains (emerges) on the copy product, and in the other area, a density therewithin becomes less dense to the degree that an image therewithin is difficult to recognize. The two areas are substantially identical in density in the printed state thereof. In a macroscopic view, a word, such as "COPY", becoming visible through copying, is hidden (embedded). In a microscopic view, the following different features are noticed at print dot levels.

Hereinafter, an image that emerges through copying is referred to as a "latent image", and an image that disappears or becomes lighter is referred to as a "background". The copy-forgery-inhibited pattern image typically contains a latent image portion and a background portion. The latent image is also referred to as a foreground, frequently used as a user interface term.

The copy-forgery-inhibited pattern image is not limited to the above-referenced structure. The copy-forgery-inhibited pattern image may be a character string, such as "COPY", or a logo, or a pattern, each emerging (being developed) on the copy product. Even if the character string, such as "COPY", is displayed in an outlined state, the character string achieves the copy forgery inhibition object. In this case, the character string "COPY" becomes a background image.

In dot printers, such as an electrophotographic printer and an ink-jet printer, an area where an image remains on a copy product (such as a latent image portion or a foreground image portion) is composed of a cluster of concentrated dots. An area (such as a background portion) that is reproduced at a density lower than a density of an area where an image disappears or remains through copying is composed of dispersed dots. The density of the entire copy-forgery-inhibited pattern image in the printed state thereof is substantially uniform by balancing both areas in density.

FIG. 18 illustrates the two areas. As shown, a copy-forgery-inhibited pattern image is constructed of a background area where dots are dispersed and a latent image portion where dots are concentrated. The two areas are produced using halftone dot process and dither process. When the copy-forgery-inhibited pattern image is generated using the halftone process, a halftone process with a large number of lines is appropriate for the latent image portion and a halftone process with a small number of lines is appropriate for the background portion. When the copy-forgery-inhibited pattern image is generated using the dither process, a dither process using a dot clustered dither matrix is appropriate for the latent image portion while a dither process using a dot dispersed dither matrix is appropriate for the background portion.

Copying apparatuses are typically subject to a limit of reproduction capability that depends on an input definition and an output definition. Within the input definition, tiny dots of an original document are read, and within the output definition, tiny dots of an original document are reproduced. If the dots in the background portion of the copy-forgery-inhibited pattern image are formed in a size less than the dot size of the reproduction limit, and if the dots in the latent image portion are formed in a size larger than the dot size of the reproduction limit, an image composed of large dots in the copy-forgery-inhibited pattern image is developed but an image composed of small dots is not reproduced through copying. As a result, a latent image emerges. Even if the dispersed dots do not completely disappear through copying, and even if the density of the latent image is low in comparison with the concentrated dot cluster after copying, the latent image is relatively distinctly visible.

FIG. 19 illustrates the emergence of the latent image. The left-hand portion of FIG. 19 illustrates a copy-forgery-inhibited pattern image in the printed state thereof. The right-hand portion of FIG. 19 illustrates a copy product that is obtained by copying the image of the left-hand portion of FIG. 18. As shown, the latent image composed of a cluster of concentrated dots emerges, and the background image composed of dispersed dots disappears.

The copy-forgery-inhibited pattern image is not limited to the above arrangement. Any type of copy-forgery-inhibited pattern image is perfectly acceptable as long as a character string, such as "COPY INHIBITED", emerges on a copy sheet so that users can clearly recognize the character string. For example, if a character string is specified as a background portion so that the character string emerges in an outlined form through copying, the purpose of the copy-forgery-inhibited pattern image is achieved.

When the copy-forgery-inhibited pattern image is preferably unrecognizable during a printing process. The density of one given unit area in the latent image portion and the density of another identical unit area in the background portion in the copy-forgery-inhibited pattern image are substantially equal to each other. The densities and the density relationships are subject to the print characteristic of a printer, temperature, humidity, and aging. When the copy-forgery-inhibited pattern image is printed, a mechanism for adjusting the density and the density relationship between the latent image portion and the background portion is used. For example, Japanese Patent Laid-Open No. 2001-197297 discloses a gradation calibration technique. According to the disclosure, a gradation calibration is performed so that a gradation of a latent image portion having undergone a halftone process and a gradation of a background portion having undergone no halftone process substantially match each other through printing. More specifically, the gradation calibration process is performed on one of a background portion having undergone the halftone process and a background portion having undergone no halftone process, or both.

In the copy-forgery-inhibited pattern image, the latent image portion is composed of a cluster of dots. On the other hand, the background portion is composed of dispersed small dots. It is difficult to perform density adjustment in a uniform fashion. Given the same amount of adjustment input in the density adjustment of the copy-forgery-inhibited pattern image, an actual response in density level is different from the latent image portion to the background portion.

Density adjustment is not easy and takes a lot of time in a known adjustment mechanism in which the density in the latent image portion is merely adjusted against the density in the background portion in the copy-forgery-inhibited pattern image.

The density adjustment of the copy-forgery-inhibited pattern image must be performed two-dimensionally on the latent image portion and the background portion taking into consideration a density relationship therebetween. It is necessary to find a desired density from within a wide range of densities. Since no common rule is applicable to a density adjustment input and a change responsive to the adjustment input in the latent image portion and the background portion, the finding of an appropriate density level is typically performed by trial and error.

The density ranges applicable to the latent image portion and the background portion in the copy-forgery-inhibited pattern image can be limited. If a density variation exceeds the limit, the density of the latent image portion and the density of the background portion cannot be set to be apparently equal to each other. The density adjustment thus becomes difficult.

When the copy-forgery-inhibited pattern image is output, an image composed of large dots (concentrated dots) constituting the latent image portion is reproduced at a relatively stable density while an image composed of small dots (dispersed dots) constituting the background portion is reproduced at a relatively unstable density. The unstable density is subject to physical characteristics as discussed below, and density changes in the latent image portion and the background portion in response to an amount of adjustment input become further different.

The physical characteristics are related to a print method. In the electrophotographic method, the size of each dot is different depending on a laser beam diameter and a voltage density. In the ink-jet print method, the size of each dot is different depending on an ejection nozzle diameter, and the volume of ink drops. In any case, the density of the background portion changes depending on these physical characteristics.

The density also greatly depends on operation environments under which the printers are used. For example, the size of dots changes depending on temperature and humidity. The size of dots also changes depending on the aging of the printer, and the degradation of a print mechanism.

A problem may arise when a density value is set using numerals on a user interface operation screen of an operation panel. For example, a user can recognize and memorize a simply set value as an "appropriate setting". Regardless of a change in the actual density of the latent image portion and the background portion in the copy-forgery-inhibited pattern image, the user may set the memorized density value again. This leads to not only an inappropriate value setting but also to a secondary erroneous setting which is based on the wrong memorized density value. It may take a significant amount of time before the user becomes aware of the wrong setting.

SUMMARY OF THE INVENTION

An aspect of the present invention is to provide an image processing apparatus and an image process method for helping users to easily adjust density in a latent image portion and a background portion in a copy-forgery-inhibited pattern image.

According to a first aspect of the present invention, an image processing apparatus for generating data of a copy-forgery-inhibited pattern image containing a latent image portion and a background portion includes at least three interfaces, and a density setter. The at least three interfaces includes a relative value interface for setting a relative value for one of a plurality of reference values respectively set for a plurality of density regions defined within a density variable range of one of the latent image portion and the background portion, a reference value interface for modifying the reference value of one density region to the reference value of another density region among the plurality of density regions, and a density adjustment interface for adjusting a density value of the one of the latent image portion and the background portion. The density setter sets density data of the copy-forgery-inhibited pattern image based on at least one of the relative value, the reference value, and the density value of the one of the latent image portion and the background portion set by at least one of the three interfaces.

According to a second aspect of the present invention, an image processing method for generating data of a copy-forgery-inhibited pattern image containing a latent image portion and a background portion, includes steps of determining a density relationship between a density of the latent image portion and a density of the background portion by performing a plurality of adjustment operations, in combination, different in an amount of adjustment relating to a variable density range in at least one of the latent image portion and the background portion, and setting, based on the density relationship between the density of the latent image portion and the density of background portion, density data of each of the latent image portion and the background portion in data of the copy-forgery-inhibited pattern image.

According to a third aspect of the present invention, an image processing method for adjusting the density of a copy-forgery-inhibited pattern image containing a latent image portion and a background portion, includes a first sample printing step for printing a plurality of copy-forgery-inhibited pattern images with one of a density of the latent image portion and a density of the background portion fixed and with the other of the density of the latent image portion and the density of the background portion varied in a first variation width, and a second sample printing step for printing the plurality of copy-forgery-inhibited pattern images with the one of the density of the latent image portion and the density of the background portion fixed and with the other of the density of the latent image portion and the density of the background portion varied in a second variation width greater than the first variation width.

According to a fourth aspect of the present invention, an image processing apparatus for adjusting the density of a copy-forgery-inhibited pattern image containing a latent image portion and a background portion, includes a first sample print output unit for outputting a plurality of copy-forgery-inhibited pattern images with one of a density of the latent image portion and a density of the background portion fixed and with the other of the density of the latent image portion and the density of the background portion varied in a first variation width, and a second sample print output unit for outputting the plurality of copy-forgery-inhibited pattern images with the one of the density of the latent image portion and the density of the background portion fixed and with the other of the density of the latent image portion and the density of the background portion varied in a second variation width greater than the first variation width.

According to a fifth aspect of the present invention, an image processing method for adjusting a density of a copy-forgery-inhibited pattern image containing a latent image portion and a background portion includes steps of adjusting a density value of the latent image portion, and adjusting a density value of the background portion. The density value of the latent image portion and the density value of the background portion can be adjusted independently of each other.

According to a sixth aspect of the present invention, an image processing apparatus for adjusting a density of a copy-forgery-inhibited pattern image containing a latent image portion and a background portion includes a first adjusting unit for adjusting a density value of the latent image portion, and a second adjusting unit for adjusting a density value of the background portion. The density value of the latent image portion and the density value of the background portion can be adjusted independently of each other.

Other features and advantages of the present invention will be apparent from the following description taken in conjunction with the accompanying drawings, in which like reference characters designate the same or similar parts throughout the figures thereof.

DESCRIPTION OF THE EMBODIMENTS

Exemplary embodiments of the present invention are described below with reference to the drawings.

FIGS. 1-7 illustrate an image processing system including a printer and a host computer as an information processing apparatus of one embodiment of the present invention. The image processing system performs a printing process and generates data of a copy-forgery-inhibited pattern image.

A portion emerging on a copy product during copying is referred to as a latent image portion or a foreground portion. A portion disappearing or becoming lighter in density than the latent image portion on a copy product is referred to as a background portion. Text information, such as "COPY" or "VOID", is input in the latent image portion. The copy-forgery-inhibited pattern image is not limited to such information. The text information may be a character outlined in an image surrounding the character on a copy product. In this case, the relationship between the clustered dots and dispersed dots in the latent image portion and the background portion is reversed from the relationship between the clustered dots and dispersed dots of the non-outlined character. The present invention is not limited to a type, a generation process, color, shape, and size of the copy-forgery-inhibited pattern image.

Figure 1:
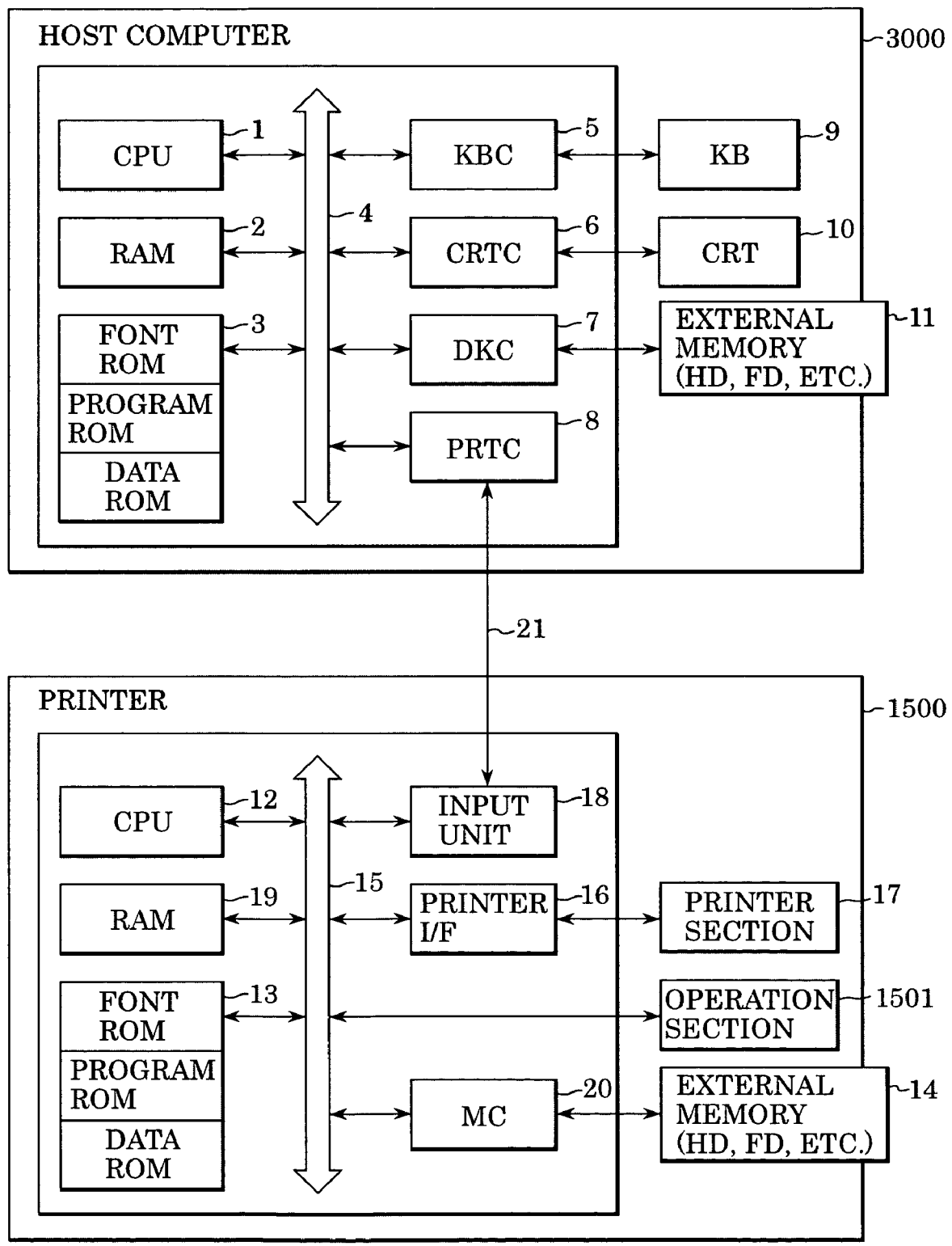
FIG. 1 is a block diagram of a printing system in accordance with one embodiment of the present invention.

FIG. 1 is the block diagram of the printing system of one embodiment of the present invention. The present invention is applicable to a system that includes a set of apparatuses, or a plurality of apparatuses linked via a local-area network or a wide-area network.

A host computer 3000 includes a central processing unit (CPU) 1. In accordance with a document processing program stored in a program read-only memory (ROM) of ROM 3 and an external memory 11, the CPU 1 controls document processing and print processing of a document containing a mixture of graphics, images, characters, and tables (spread sheets) as will be discussed in detail with reference to FIG. 2 through FIG. 17C. The CPU 1 generally controls devices connected to a system bus 4. The program ROM of the ROM 3 or the external memory 11 stores an operating system (OS) as a control program of the CPU 1. A font ROM of the ROM 3 or the external memory 11 stores font data used for document processing. A data ROM of the ROM 3 or the external memory 11 stores a variety of data used for document processing. A random-access memory (RAM) 2 functions as a main memory and a work area for the CPU 1.

A keyboard controller (KBC) 5 controls operational inputs entered from a keyboard 9 or a pointing device (not shown). A cathode-ray tube controller (CRTC) 6 controls a displaying process of the CRT display 10. A disk controller (DKC) 7 controls accessing to the external memory 11, such as a hard disk (HD) or floppy disk (FD). The external memory 11 stores a boot program, a variety of applications, font data, user files, edit files, and a printer control command generating program (hereinafter referred to as printer driver). A printer controller (PRTC) 8 is connected to a printer 1500 via a two-way interface 21, and controls communication and process of the printer 1500.

The CPU 1 rasterizes an outline font on a display information RAM setup in the RAM 2. The WYSIWYG (what you see is what you get) function is thus achieved on the CRT 10. The CPU 1 opens a variety of registered windows in response to a command pointed to by a cursor (not shown) on the CRT 10, and performs a variety of data processing. To perform a print process, a user opens a window for print settings, and sets a print processing method on a printer driver including a selection of a print mode. The printer 1500 is controlled by a CPU 12 arranged therewithin. The printer CPU 12 outputs an image signal as print output information to a printer section (printer engine) 17 connected to a system bus 15, via a printer interface 16, in accordance with a control program stored in a program ROM of a ROM 13 or the control program stored in an external memory 14, such as a hard disk. A font ROM of the ROM 13 stores font data used for generating print output information. A data ROM of the ROM 13 stores information used on the host computer if the printer 1500 has no external memory 14.

The CPU 12 communicates with the host computer 3000 via an input unit 18, and notifies the host computer 3000 of information of the printer 1500. A RAM 19 functions as a main memory, i.e., a work area of the CPU 12. The memory capacity of the CPU 12 can be expanded by adding optional RAMs connected to an expansion port (not shown). The RAM 19, as a non-volatile RAM (NVRAM), serves as an output information rasterizing area, and an environmental data storage area. A memory controller (MC) 20, such as an integrated circuit (IC) card, controls access to the external memory 14, such as a hard disk (HD). The external memory 14, arranged as an optional unit, stores font data, an emulation program, form data, etc. An operation panel 1501 includes switches and a light-emitting diode (LED) display.

The number of external memories 14 is not limited to one. A plurality of external memories 14 can be arranged to store programs for translating different printer control languages. An NVRAM (not shown) may be arranged to store printer mode setting information from the operation panel 1501.

The printer section 17 includes an electrophotographic engine in this embodiment. An image and a copy-forgery-inhibited pattern image associated therewith are printed in the form of toner dots in accordance with print data. The present invention is not limited to the electrophotographic method. For example, the present invention is applicable to a printer that performs a print process using dots, like an ink-jet method.

Figure 2:
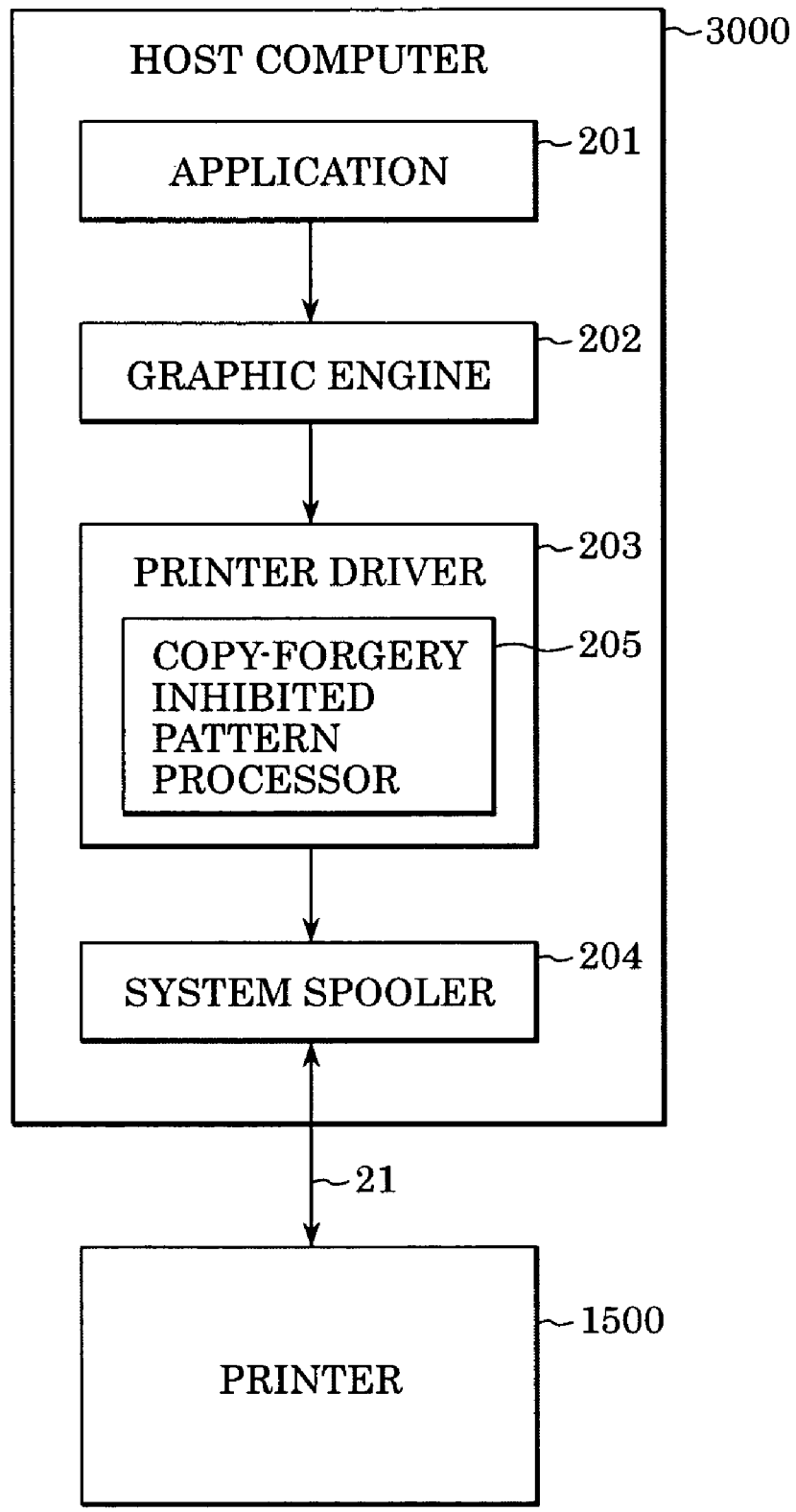
FIG. 2 illustrates a printing process performed by a computer of FIG. 1.

FIG. 2 illustrates a print process performed by the host computer 3000 of FIG. 1. An application 201, a graphic engine 202, a printer driver 203, and a system spooler 204 are program modules present as files stored in the external memory 11. In operation, the program modules are loaded onto the RAM 2 and then executed by a running OS or a module using the modules. The application 201 and the printer driver 203 are stored onto an FD or a CD-ROM (compact disk—ROM) (not shown) of the external memory 11 or an HD of the external memory 11 via a network (not shown). The application 201 stored in the external memory 11 is loaded onto the RAM 2 before being executed. When a print process is performed from the application 201 to the printer 1500, a graphic engine 202 loaded onto the RAM 2 and ready for operation renders print data.

The graphic engine 202 loads a printer driver 203 prepared for a corresponding printer from the external memory 11 onto the RAM 2, and sets the output of the application 201 on the printer driver 203. The graphic engine 202 converts a graphic device interface (GDI) function received from the application 201 to a device driver interface (DDI) function, and outputs the DDI function to the printer driver 203.

The printer driver 203 converts the DDI function received from the graphic engine 202 into a control command recognizable by the printer, such as a page description language (PDL). The printer control command is output to the system spooler 204 loaded onto the RAM 2 by the OS. The system spooler 204 then transfers the printer control command to the printer 1500 via the two-way interface 21 as print data.

The printing system of FIG. 2 includes a copy-forgery-inhibited pattern processor 205 within the printer driver 203. The printer driver 203 functions to print the copy-forgery-inhibited pattern image using the copy-forgery-inhibited pattern processor 205, thus generating a command for the copy-forgery-inhibited pattern image.

Figure 3:
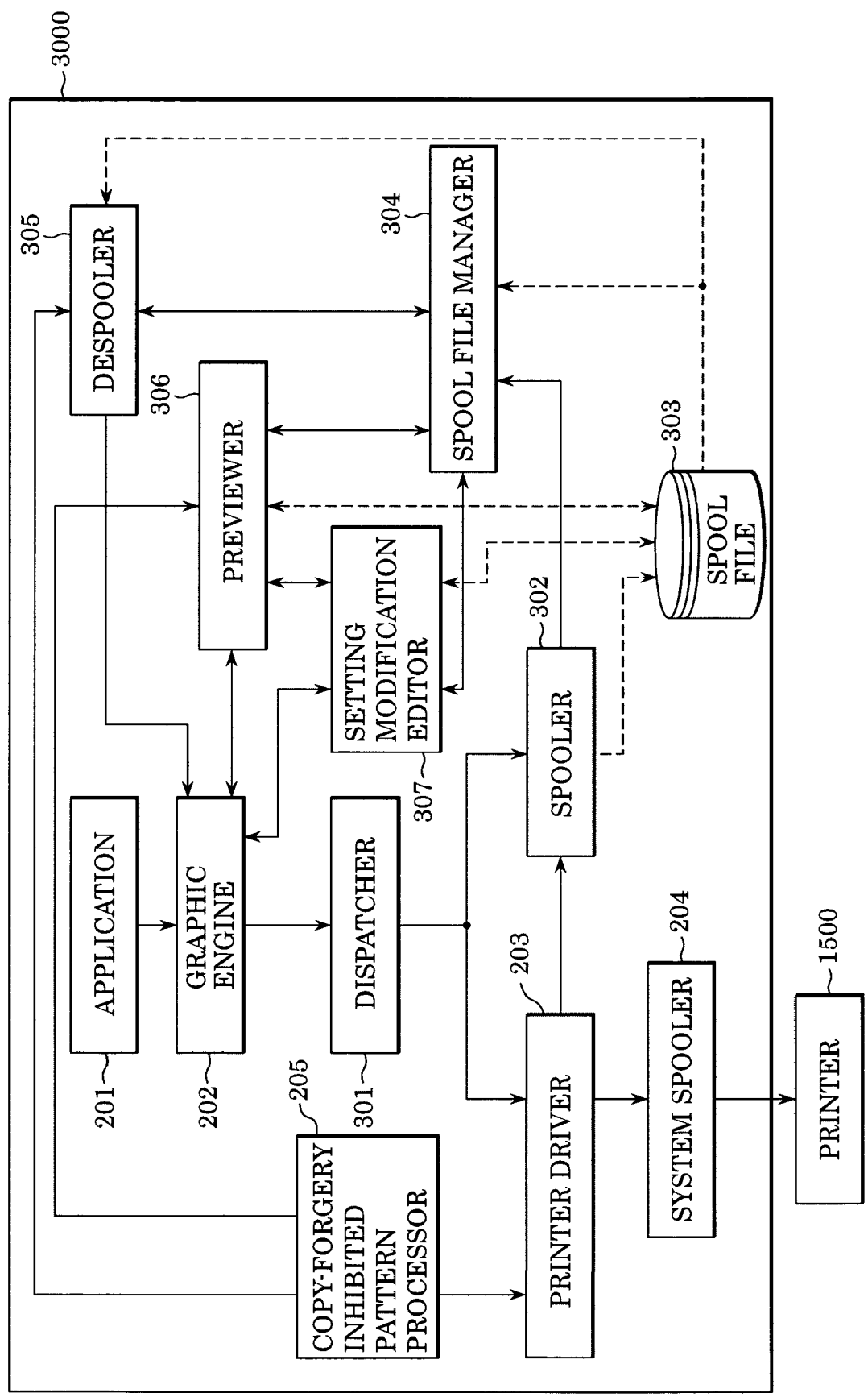
FIG. 3 is a block diagram of an extension of the process of FIG. 2, performed by the computer of FIG. 1.

FIG. 3 is a block diagram of an extension of the process of FIG. 2, performed by the computer 3000 of FIG. 1. In this process, a spool file 303 composed of intermediate code is generated in the middle of transferring a print command from the graphic engine 202 to the printer driver 203. As shown in FIG. 2, the application 201 is released from the print process when the printer driver 203 completes the conversion of all print commands from the graphic engine 202 into a control command of the printer 1500. In the arrangement of FIG. 3, in contrast, the application 201 is released from the print process when the spooler 302 converts all print commands to intermediate code data and outputs the intermediate code data to a spool file 303. The arrangement of FIG. 3 typically takes a shorter time than the arrangement of FIG. 2. The arrangement of FIG. 3 permits the content of the spool file 303 to be processed. In this way, print data is subjected to functions not available from the application 201. For example, during printing, the print data is expanded, contracted, or reduced so that a plurality of pages are printed on a single page. To spool the intermediate code in the sequence of FIG. 3, a system extension can be made to the arrangement of FIG. 2. To process the print data, setting is input on a window typically provided by the printer driver 203, and the printer driver 203 stores the setting content in the RAM 2 or the external memory 11.

The extension arrangement of FIG. 3 is described in detail below. As shown, the DDI function as the print command from the graphic engine 202 is received by a dispatcher 301. If the print command (DDI function) received by the dispatcher 301 from the graphic engine 202 is based on the print command (GDI function) the application 201 has issued to the graphic engine 202, the dispatcher 301 loads the spooler 302 from the external memory 11 to the RAM 2, and transfers the print command (GDI function) to the spooler 302 rather than to the printer driver 203.

The spooler 302 analyzes the received print command, and converts the print command into intermediate code on a per page basis, and outputs the intermediate code to the spool file 303. The spool file of the intermediate code stored on a per page basis is referred to as a page description file (PDF). The spooler 302 acquires print setting (Nup, both side printing, stapling, color/monochrome, etc.) of the print data set in the printer driver 203 as a file on a per job basis, and stores the print setting onto the spool file 303. The setting file stored on a per job basis is also referred to a spool description file (SDF). The SDF will be discussed further later. The spool file 303 is generated as a file in the external memory 11. Alternatively, the spool file 303 may be generated on the RAM 2. The spooler 302 loads a spool file manager 304 from the external memory 11 to the RAM 2, and notifies the spool file manager 304 of the generation status of the spool file 303. Based on the content of the print setting of the print data stored in the spool file 303, the spool file manager 304 determines whether a printing operation is possible.

If the spool file manager 304 determines that the printing operation using the graphic engine 202 is possible, the spool file manager 304 loads a despooler 305 from the external memory 11 to the RAM 2. The spool file manager 304 instructs the despooler 305 to perform a printing operation of the page description file of the intermediate code described in the spool file 303.

The despooler 305 processes the page description file contained in the spool file 303 in accordance with the job description file containing process setting information contained in the spool file 303, reproduces the GDI function, and outputs the GDI function via the graphic engine 202 again. A rendering process for printing the copy-forgery-inhibited pattern image is performed by loading the copy-forgery-inhibited pattern processor 205. In this printing system, the copy-forgery-inhibited pattern processor 205 together with the despooler 305, the spool file manager 304, etc., generates commands for the copy-forgery-inhibited pattern image.

The copy-forgery-inhibited pattern processor 205 may be in the form of a built-in module of the printer driver 203 or a library module added at a separate installation.

If the print command (DDI function) received by the dispatcher 301 from the graphic engine 202 is based on the print command (GDI function) the despooler 305 has issued to the graphic engine 202, the dispatcher 301 transfers the print command to the printer driver 203 rather than to the spooler 302. The printer driver 203 generates a printer control command of a page description language based on the DDI function acquired from the graphic engine 202, and outputs the printer control command to the printer 1500 via the system spooler 204.

The extension system of FIG. 3, further including a previewer 306, and a setting modification editor 307, previews the copy-forgery-inhibited pattern image, modifies the print setting, and combines a plurality of jobs.

The content of setting entered on a property of a printer driver is stored as a setting file in a structure (referred to as DEVMODE in Windows® OS) provided by the OS. The structure contains a setting of whether to store the file content in the spool file manager 304 during process setting. The setting is also contained in the spool file 303. The spool file manager 304 reads the process setting via the printer driver 203. If the storage is specified in the process setting, the spool file manager 304 generates and stores the page description file and the job setting file in the spool file 303. A popup window of the spool file manager 304 displays a job list spooled in the spool file 303.

When previewing of a single job or a combined job is specified on the window of the spool file manager 304, a previewer 306 is loaded from the external memory 11 to the RAM 2. The spool file manager 304 instructs the previewer 306 to perform a preview process for the job of the intermediate code described in the spool file 303.

Figure 4:
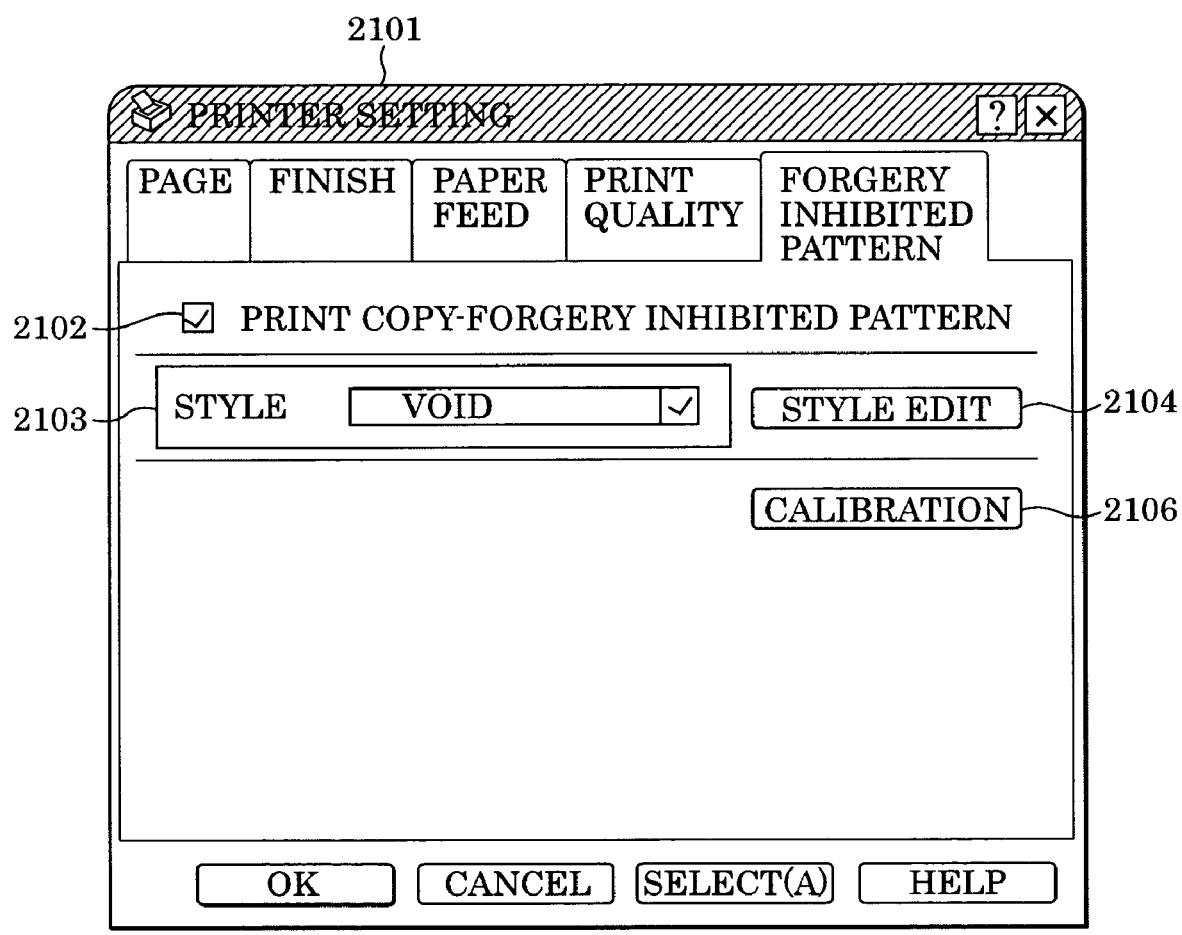
FIG. 4 illustrates a setting screen of a copy-forgery-inhibited pattern image printing function.
Figure 5:
FIG. 5 illustrates a dialog screen for setting of the copy-forgery-inhibited pattern image.

FIGS. 4 and 5 illustrate user interfaces for print setting for a copy-forgery-inhibited pattern image.

FIGS. 4 and 5 illustrate initial screens of the user interface of the copy-forgery-inhibited pattern processor 205 that is arranged internal to the printer driver 203 as shown in FIG. 2 or arranged as an independent module external to the printer driver 203 as shown in FIG. 3. Settings for the copy-forgery-inhibited pattern image print are entered on a property sheet 2101 in the dialog screen of FIG. 4.

A check mark is placed in a check box 2102 to specify a copy-forgery-inhibited pattern image print (including a copy-forgery-inhibited pattern image) in accordance with the print job. A style box 2103 displays style information to specify a plurality of pieces of setting information for the copy-forgery-inhibited pattern image print with a single identifier (style). The printer driver 203 can select a plurality of styles, and each style is registered. A style editing dialog screen 2201 shown in FIG. 5 is displayed when a button 2104 is selected.

A calibration button 2106 is used for a calibration process where the latent image portion and the background portion of the copy-forgery-inhibited pattern image are density adjusted. By selecting the calibration button 2106, a dialog screen 2201 of FIG. 10 appears.

FIG. 5 illustrates one example of the dialog screen 2201 for editing the detailed setting of the copy-forgery-inhibited pattern image print.

In the example shown in FIG. 5, the dialog screen 2201 covers the entire copy-forgery-inhibited pattern image information editing dialog. The result of the copy-forgery-inhibited pattern image generated from corresponding copy-forgery-inhibited pattern information is previewed on the dialog screen 2201. A list of styles selectable in the style box 2103 of FIG. 4 is shown in a list area 2202. Styles are newly added and removed using the buttons 2203 and 2204, respectively. The name of a currently specified style is shown in a name box 2205.

A radio button 2206 is used to select the type of a display object used in the copy-forgery-inhibited pattern image print. A text object is used if "character string" is selected, and image data, such as a bitmap (BMP), is used if "image" is selected. Since the "character string" is selected as shown in FIG. 5, setting information relating to a text object designated by reference numerals 2207 through 2209 in the dialog screen 2201 is displayed for setting. If the "image" is selected by the radio button 2206, information designated by reference numerals 2207 through 2209 is not displayed, and instead, a file selection dialog button 2216 (not shown) is displayed on the dialog screen 2201.

A box 2207 is used to display and edit a character string as the copy-forgery-inhibited pattern image. A box 2208 is used to display and edit font information of the character string. In this embodiment, only the name of font names is selectable. Family information of fonts (such as bold, italic, etc.) or ornamental writing information may be set as selectable. A box 2209 is used to display and set the font size of the character string used in the copy-forgery-inhibited pattern image. The font size is selectable from three levels of large, intermediate, and small. Alternatively, a widely used font size designation method may be used. For example, a point number may be directly input.

A radio button 2210 is used to set the order of printing of the copy-forgery-inhibited pattern image and the print data. If water mark printing is selected, the print data is printed after the copy-forgery-inhibited pattern image is printed. If overlap printing is selected, the copy-forgery-inhibited pattern image is printed after the print data is printed. A radio button 2211 is used to specify the inclination angle of the character string. In the present embodiment, the inclination angle can be selected from the three inclination angles of a right upward angle, a right downward angle, and a horizontal angle. The method of selecting the inclination angle may be extended to permit any arbitrary angle. For example, a box that allows a user to enter a numeric inclination angle or a slider bar that allows the user to intuitively input an inclination angle may be arranged on the dialog screen 2201. A box 2212 is used to display and specify a color of the copy-forgery-inhibited pattern image.

A check box 2213 is used to switch between a foreground pattern and a background pattern. If the check box 2213 is checked, the foreground pattern emerges during copying. If the check box 2213 is not checked, the background pattern emerges during copy. A camouflage image box 2214 is used to specify a camouflage image for recognizing a copy-forgery-inhibited pattern image embedded in a document. One camouflage image can be selected from among a plurality of predetermined camouflage images. An option to select no camouflage image is also available.

Figure 6:
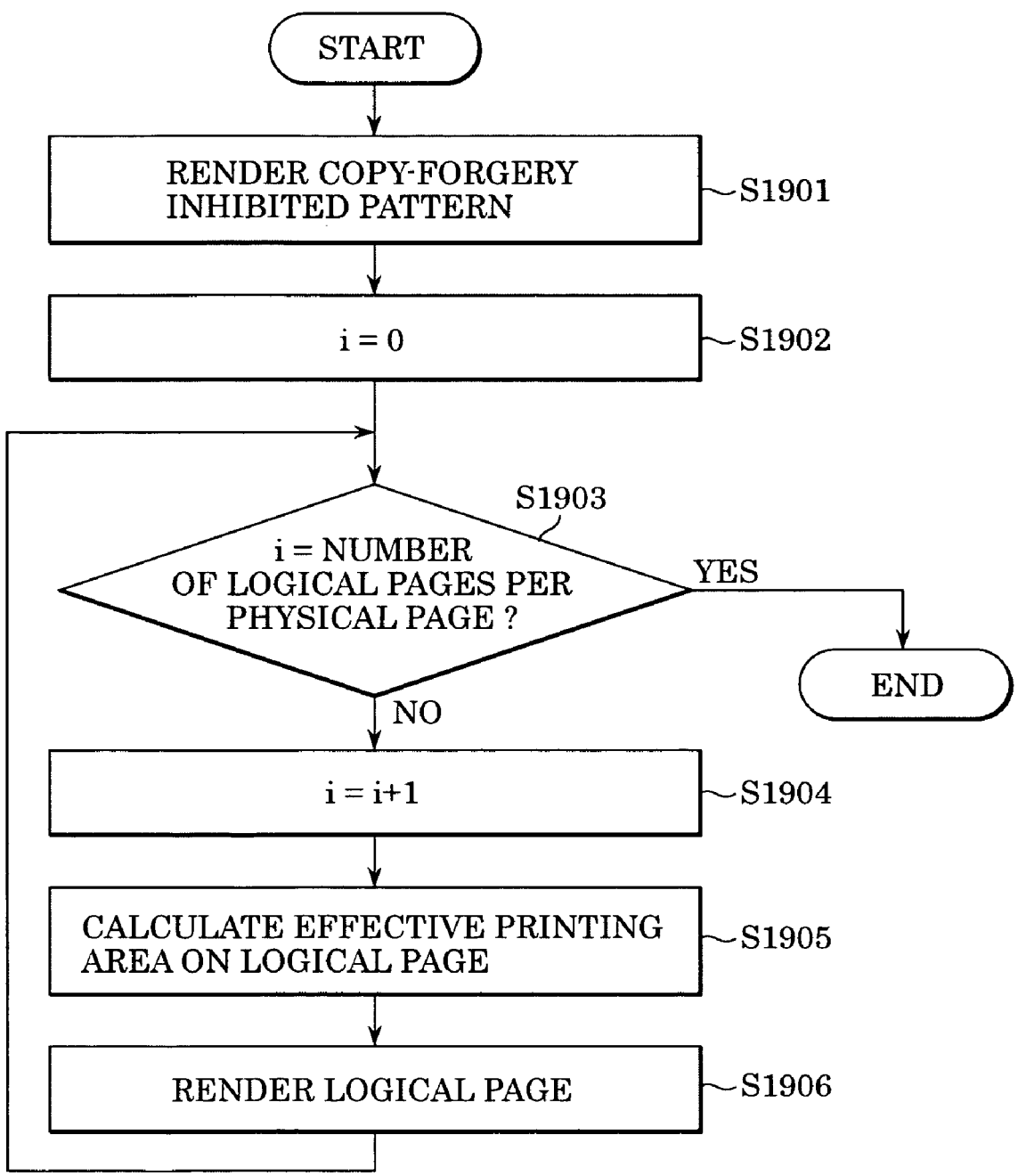
FIG. 6 is a flowchart illustrating a rendering process of the copy-forgery-inhibited pattern image.
Figure 7:
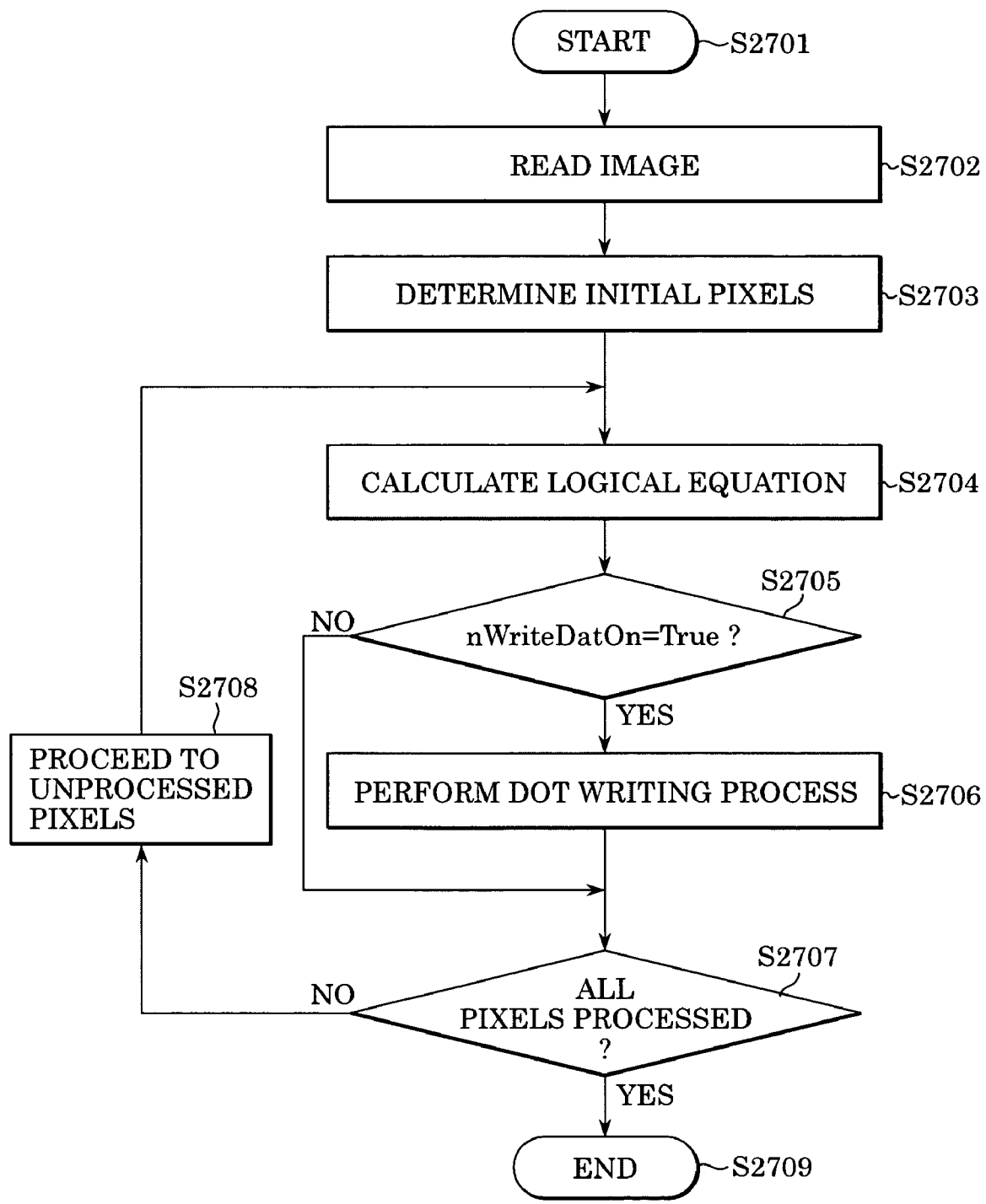
FIG. 7 is a flowchart illustrating details of the rendering process of the copy-forgery-inhibited pattern image processing shown in FIG. 6.

FIGS. 6 and 7 are flowcharts illustrating a print data generation process for printing the copy-forgery-inhibited pattern image. As previously discussed, two print orders of the watermark printing and the overlap printing are permitted when the printing of the copy-forgery-inhibited pattern image is printed. The print data generation process is also different depending on the print order. Since the present invention is not closely related to the print order, only the watermark printing is described below.

The watermark printing where the copy-forgery-inhibited pattern image is printed first is described with reference to a flowchart of FIG. 6. In the watermark printing, the print data corresponding to original document data is rasterized on the copy-forgery-inhibited pattern image data in a bitmap memory of the printer 1500. The print data of the copy-forgery-inhibited pattern image is generated earlier than the generation of the print data corresponding to the original document data.

In step S1901, the copy-forgery-inhibited pattern processor 205 generates the copy-forgery-inhibited pattern image under the setting entered as shown in FIG. 5. A detailed process will be discussed later with reference to FIG. 7. The print data of the original document is then generated. In step S1902, a page counter is initialized. In step S1903, it is determined whether the count of the page counter has reached the number of predetermined logical pages per physical page. If the count reaches the number of logical pages, processing ends. If the count is not equal to the number of logical pages, processing proceeds to step S1904. In step S1904, the page counter increments the count thereof by one. In step S1905, an effective printing area with respect to a logical page to be subjected to the print data generation process is calculated based on the number of logical pages per page and the count. In step S1906, a current logical page number is read from information relating to the physical page with the counter as an index, and contracts the logical pages so that the logical pages fit into the effective printing area. The contraction is not necessary if N page printing is not specified.

FIG. 7 is a flowchart illustrating the copy-forgery-inhibited pattern image generation process in detail in step S1901 of FIG. 6 in accordance with one embodiment of the present invention. The copy-forgery-inhibited pattern image generation process is described below with reference to FIG. 7.

In step S2701, the copy-forgery-inhibited pattern image generation process starts. More specifically, a copy-forgery-inhibited pattern image generation command and copy-forgery-inhibited pattern image print setting information are input to the copy-forgery-inhibited pattern processor 205. In step S2702, the copy-forgery-inhibited pattern processor 205 reads a background threshold pattern, a foreground threshold pattern, a basic image, and a camouflage image. The basic image is image data that serves as a base for generating the copy-forgery-inhibited pattern image.

In step S2703, the copy-forgery-inhibited pattern processor 205 determines initial pixels for generating the copy-forgery-inhibited pattern image. For example, the initial pixel is set at a top left corner of an effective printing area when the copy-forgery-inhibited pattern image is generated by image processing in a raster scan order from the top left to bottom right corner of the effective printing area of an A4 size sheet. In this case, the printing effective area is identical to the copy-forgery-inhibited pattern image area.

In step S2704, the copy-forgery-inhibited pattern processor 205 arranges the background threshold pattern, the foreground threshold pattern, the basic image, and the camouflage image on tiles from the top left corner of the copy-forgery-inhibited pattern image area by computing equation (1) (shown below). The copy-forgery-inhibited pattern processor 205 determines through this computation whether to write a pixel value of a dot at a pixel position during printing. The pixel value is color information. The background threshold pattern and the foreground threshold pattern are composed of image data of "1" and "0" corresponding to dot writing and dot non-writing. These images are data binarized by the dither matrices appropriate for producing the foreground (latent) image and the background image.

$$n\text{WriteDotOn} = n\text{camouflage} \times ((n\text{SmallDotOn} \times \neg n\text{HiddenMarkOn}) + (n\text{LrgeDotOn} \times n\text{HiddenMarkOn})) \quad (1)$$

where:
- ncamouflage is 0 if a pixel of interest constitutes a camouflage pattern in the camouflage image; otherwise, ncamouflage is 1;
- nSmallDotOn is 1 if a pixel in the foreground threshold pattern is black, otherwise, nSmallDotOn is 0 (color is not defined by this setting);
- nLrgeDoton is 1 if a pixel in the background threshold pattern is black, otherwise, nLrgeDotOn is 0 (color is not defined by this setting);
- nHiddenMark is 1 if a pixel of interest in the basic image constitutes a latent image, and nHiddenMark is 0 if the pixel of interest constitutes a background image; and
- ¬nHiddenMark is the negation of nHiddenMark, namely, ¬nHiddenMark is 0 in the foreground image, and ¬nHiddenMark is 1 in the background image.

It is not necessary to calculate all of the elements of equation (1) in the pixels to be processed. Unnecessary calculations may be omitted to achieve faster processing.

For example, if nHiddenMark=1, ¬nHiddenMark=0, and if nHiddenMark=0, ¬nHiddenMark=1. If nHiddenMark=1, the value of equation (2) (shown below) becomes nLrgeDotOn, and if nHiddenMark=0, the value of equation (2) becomes nSmallDotOn.

As expressed in equation (1), the value of ncamouflage is a multiplicand, and if nCamouflage=0, nWriteDotOn=0. Therefore, if nCamouflage=0, the calculation of equation (2) can be omitted.

$$(nSmallDotOn \times \neg nHiddenMarkOn) + (nLrgeDotOn \times nHiddenMarkOn) \quad (2)$$

In the generated copy-forgery-inhibited pattern image, an image as large as the least common multiples of the vertical length and the horizontal length of the background threshold pattern, the foreground threshold pattern, the basic image, and the camouflage image become a minimum unit of repetition. The copy-forgery-inhibited pattern processor 205 generates a portion of the copy-forgery-inhibited pattern image as the minimum unit of repetition, and periodically arranges tiles, each tile equal to the portion of the copy-forgery-inhibited pattern image within the size of the copy-forgery-inhibited pattern image area. The process time required for the copy-forgery-inhibited pattern image generation is thus shortened.

In step S2705, the CPU 1 determines the calculation result (the value of nWriteDoton) in step S2704. More specifically, if nWriteDotOn=1, processing proceeds to step S2706. If nWriteDotOn=0, processing proceeds to step S2707.

In step S2706, a pixel writing process for dots to be printed is performed. The pixel value can be changed depending on the color of the copy-forgery-inhibited pattern image. A color copy-forgery-inhibited pattern image can be produced by setting the pixel values in accordance with the toner of the printer 1500 or the color of ink. A secondary color can be used by combining a plurality of toners or inks.

In step S2707, it is determined whether all pixels in an area to be processed have been processed. If it is determined that not all pixels have been processed, processing proceeds to step S2708. Unprocessed pixels are selected, and steps S2704-S2706 are performed. When it is determined in step S2707 that all pixels in the area to be processed have been processed, processing ends in step S2709.

The copy-forgery-inhibited pattern image data and the original document data are synthesized as a bitmap image in the printer 1500. If the overlap printing is specified in the printer synthesis process, the original document image data is rasterized on a bitmap memory, and the copy-forgery-inhibited pattern image is rasterized so that the copy-forgery-inhibited pattern image overlaps the original document image data. If the copy-forgery-inhibited pattern image is merely superimposed on the original document image, the original image becomes invisible. If the overlap printing is set, AND/OR logical rendering is used to prevent the copy-forgery-inhibited pattern image from overwriting the original document image. For example, if a pixel of the bitmap image obtained by rasterizing the original document image data has a value corresponding to white, the copy-forgery-inhibited pattern image corresponding to that pixel overwrites the pixel position of the bitmap memory. If a pixel has a value other than white, the copy-forgery-inhibited pattern image does not overwrite.

A density calibration process for the latent image portion (also simply referred to as a foreground) and the background portion (also simply referred to as a background) of the copy-forgery-inhibited pattern image is described below.

Figure 8A:
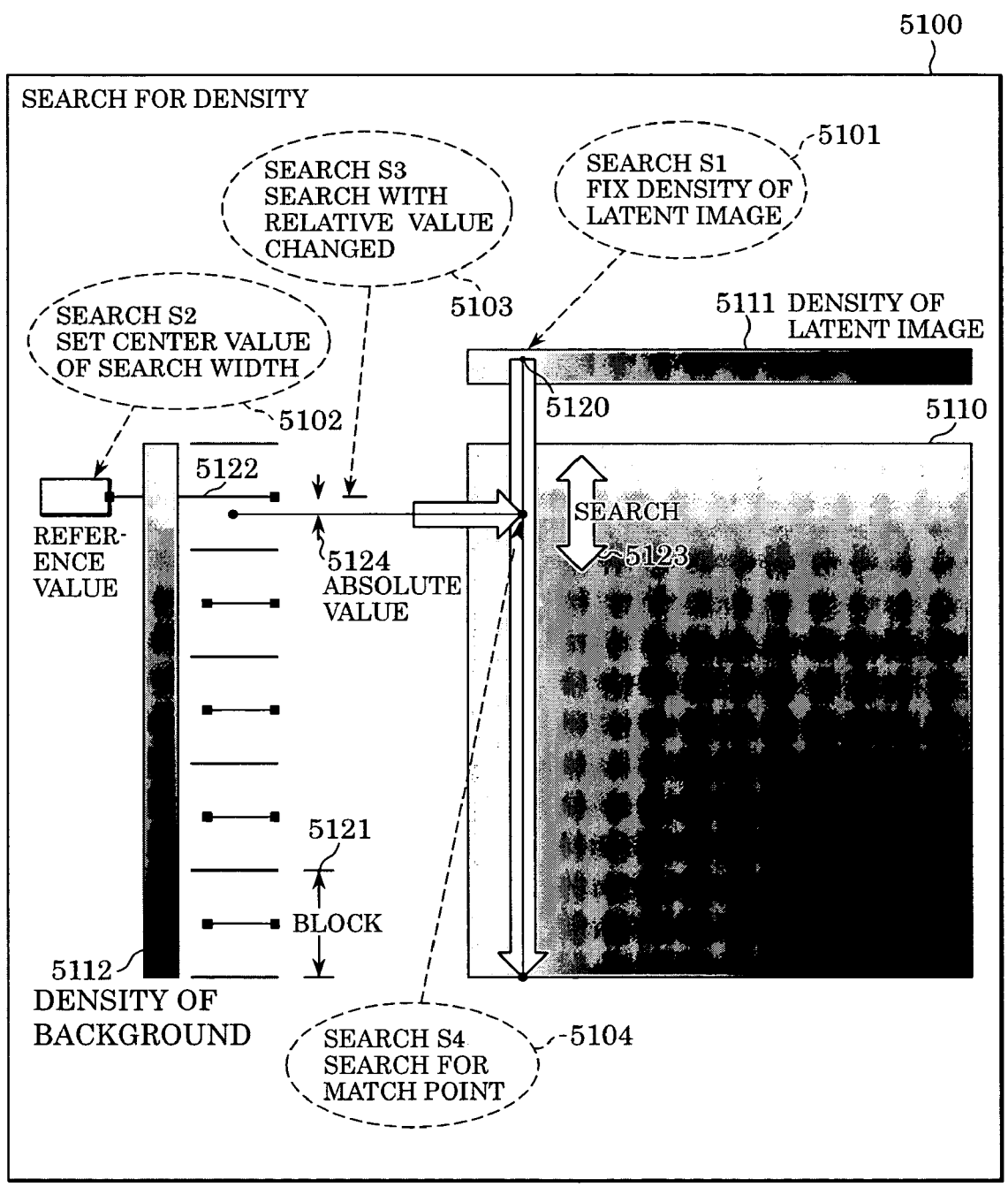
FIGS. 8A and 8B illustrate a density correction operation of a foreground and a background of the copy-forgery-inhibited pattern image.
Figure 8B:
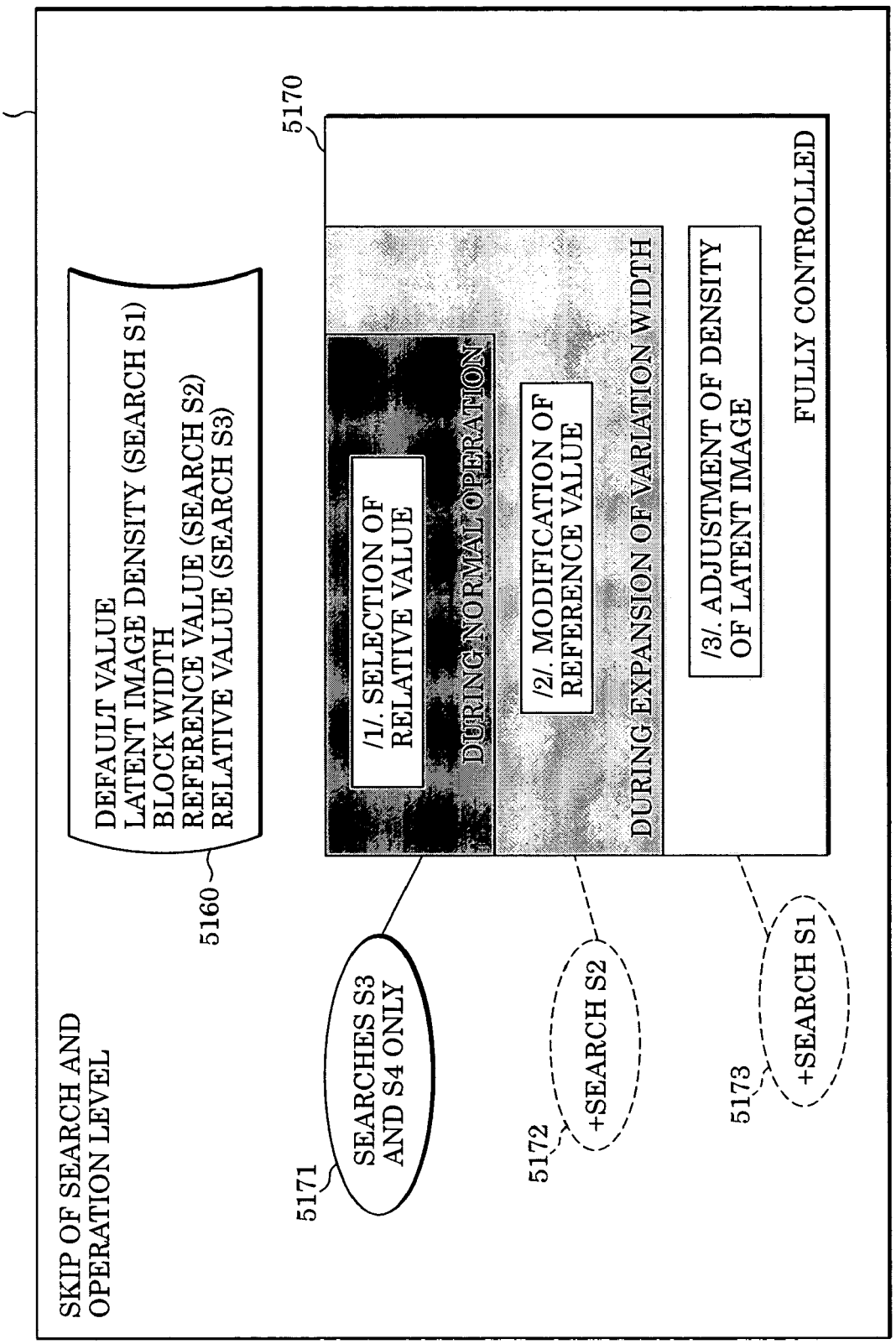

FIGS. 8A and 8B illustrate the density calibration process of the foreground and the background. FIG. 8A illustrates a density search diagram 5100 in accordance with one embodiment of the present invention. A density area 5110 to be density searched has two axes of a foreground density 5111 and a background density 5112. The position of the density area 5110 is determined by the density values in the two axes. The foreground density 5111 and the background density 5112 are individually set and the densities of the foreground and the background are searched so that the density of the foreground and the density of the background in the copy-forgery-inhibited pattern image are substantially equal to each other. If the foreground density 5111 and the background density 5112 do not change linearly, density searching with both densities controlled is difficult.

In search (SI) 5101, the foreground density 5111 is fixed to a relatively low density 5120. The copy-forgery-inhibited pattern image can be a density that does not obscure the image, such as of a document, which is printed together with the copy-forgery-inhibited pattern image (in other words, the image of print data is recognizable even if the copy-forgery-inhibited pattern image overlaps the print data). The foreground density 5111 is typically set to be in a low density area. Since the foreground is reproduced stably in density with concentration of large dots, density calibration operation is free from instability even if the foreground is used as a reference.

The density of the background matching a density 5120 in the latent image portion is searched. In search (S2) 5102, the center value of a search width is set. In other words, a range of the background density extending from the minimum density to the maximum density thereof is divided into blocks 5121 of a predetermined number. To represent each block 5121, a reference value 5122 is used as a representative value. In the search (S2) 5102, the reference value 5122 is set as the center of search width. This setting thus selects a block to be searched.

In a search (S3) 5103, density searching is performed with the relative value 5124 changed and with the reference value at zero. A variable range 5123 of the relative value 5124 is ±½ of the block width.

In search (S4) 5104, a point where the foreground density and the background density approximately match each other is found. Then, the relationship of a foreground density 5112=reference value 5122+relative value 5124 holds.

In the discussion of the present embodiment, a statement that the foreground density is equal to the background density or a statement that the foreground density is approximately equal to the background density means the density relationship between the foreground and the background makes the foreground (latent image) in the printed copy-forgery-inhibited pattern image difficult to recognize. In such a case, some difference in density between the foreground and the background is still present even when the latent image is difficult in the user setting, and a statement that the foreground density and the background density match each other is still used. The word "density" as used herein means density data or density information set in density adjustment, and a "density" recognized in the print result.

For simplicity of explanation, the block 5121 has no overlap with an adjacent block 5121. But one block 5121 may partially overlap another adjacent block 5121. In an operation example to be discussed later, adjacent blocks overlap each other.

FIG. 8B illustrates a density calibration operation with several searches skipped depending on the level of density adjustment, and the operation level of the density calibration operation by a user in accordance with the range of adjustment skipping.

As shown in FIG. 8B, initial values 5160 are prepared in the density calibration operation. Latent image portion density, a block width, a reference value, and a relative value are set as the initial values 5160. As will be described later, the user can skip operations for the search S1 and the search S2 discussed with reference to FIG. 8A depending on the level of density change.

In a normal calibration range 5171, a density change in the copy-forgery-inhibited pattern image falls within the block width, and an amount of density adjustment is relatively small. In this case, "/1/. Selection of Relative Value" is sufficient, i.e., only the searches S3 and S4 are performed in the normal calibration range 5171.

In a variation width expanded calibration range 5172, a density change exceeds a block width, and the amount of adjustment increases accordingly. In this case, "/2/. Modification of Reference Value" is also performed. In the variation width expanded calibration range 5172, the search S2 is also performed in addition to the standard search (S3 and S4).

In a fully controlled calibration range 5173, the foreground is also density adjusted in addition to the background. "/3/. Adjustment of Density of Latent Image" is also performed. In the fully controlled calibration range 5173, the search S1 is also performed (in addition to searches S2, S3 and S4).

The purpose of the operation level setting responsive to the amount of density adjustment is to shift from an operation with a small amount of adjustment to a large amount of adjustment in order to search for a point where the density of the foreground and the density of the background are equalized. By performing the search with the calibration range changed stepwise, the point where the foreground and the background are equalized in density is reliably found. The density correction operation of the copy-forgery-inhibited pattern image is facilitated in this way. In "/1/. Selection of the Relative Value", the amount of adjustment falls within one block, and in "/2/ Modification of Reference Value", the amount of adjustment exceeds beyond the block. The amount of adjustment is thus greater in the "/2/. Modification of Reference Value" than in "/1/. Selection of the Relative Value".

In "/3/. Adjustment of Density of Latent Image", the latent image density is directly adjusted two-dimensionally. A two-dimensional adjustment involves a larger amount of adjustment than a one-dimensional adjustment in this specification. The present invention includes embodiments that perform a plurality of adjustments different in calibration range. For example, the above-referenced relationship between the latent image and the background can be reversed. More specifically, a reference value and a value relatively responsive to the reference value are set up in the latent image density. The number of blocks may be set to be different, or the sizes of the blocks may be set to be different from each other. A combination of the three adjustment methods may be performed.

The operation level is selected depending on the frequency of each adjustment range occurring in the density adjustment and the skill of each user. More specifically, the operation of varying the relative value in the normal operation calibration range 1571 is appropriate for a relatively small density change that occurs frequently. The user can easily adjust density by performing a simple operation of the searches S3 and S4 only. In the fully controlled calibration range 5173, density adjustment is performed by changing the density in the latent image. A skilled user may adjust density at this operation level from the start.

Figure 9:
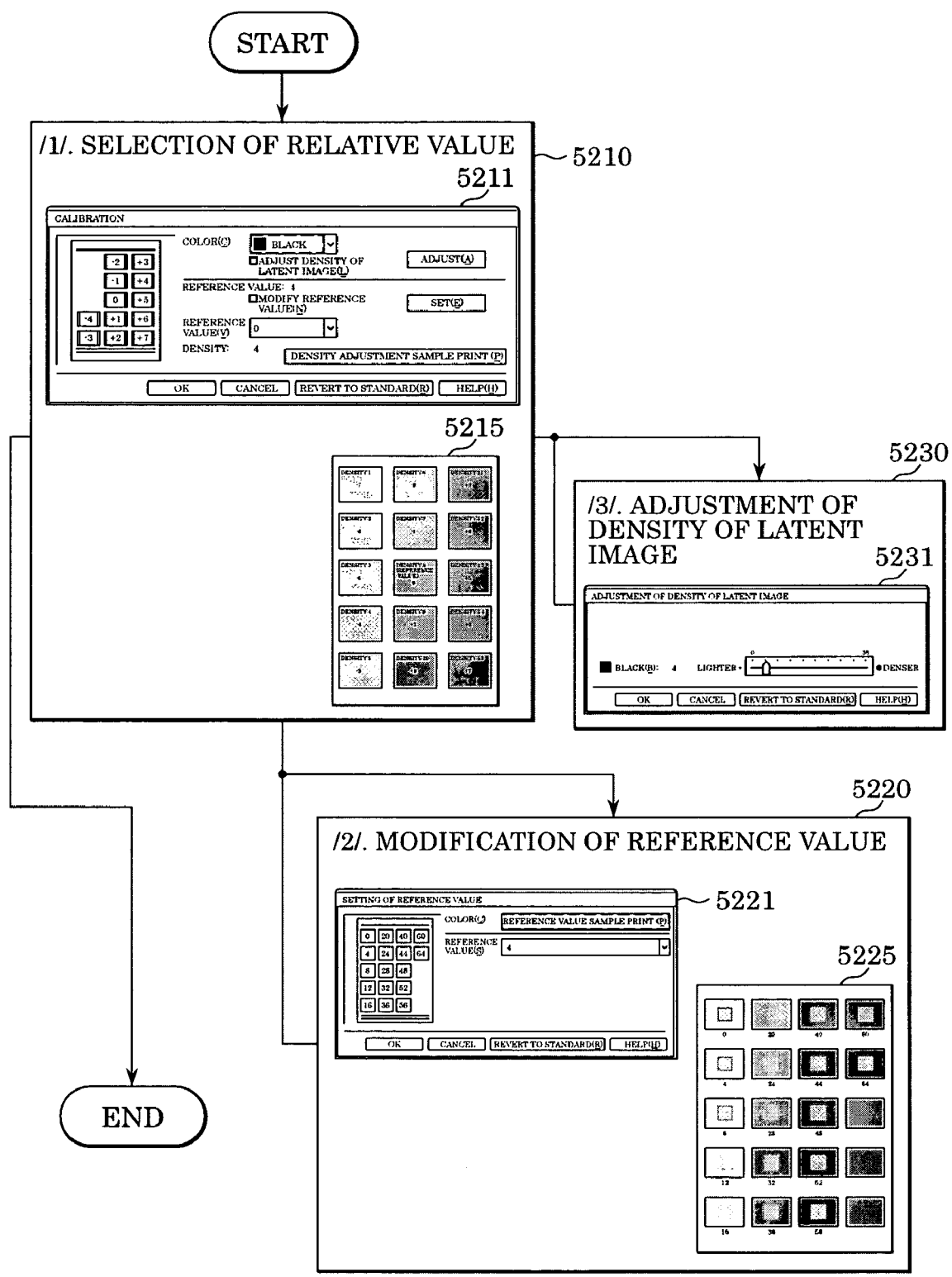
FIG. 9 illustrates specific density adjustment operations corresponding to three operation levels discussed with reference to FIG. 8.

FIG. 9 illustrates the specific density calibration operations of the three operation levels discussed above.

As shown, "/1/. Selection of Relative Value" operation 5210 is performed by combining an operation in an operation section 5211 and a relative value selection sample print 5215 that is output in response to the operation of the operation section 5211. A small copy-forgery-inhibited pattern image at a relative density X at each relative density variation (–X to +X) is printed as a thumbnail sample print 5215. In "/1/. Selection of Relative Value" operation 5210, the user recognizes and selects a copy-forgery-inhibited pattern image having a latent image most difficult to recognize with reference to the background density, i.e., a thumbnail copy-forgery-inhibited pattern image where the foreground density and the background density are substantially equal to each other. The user then selects a value, presented in the selected thumbnail copy-forgery-inhibited pattern image, from a relative value selection dropdown list of the operation section 5211.

"/2/. Modification of Reference Value" operation 5220 is performed by combining an operation in an operation section 5221 and a reference value selection sample print 5225 that is output in response to the operation of the operation section 5221. A thumbnail copy-forgery-inhibited pattern image at each reference value of density is printed together with the reference value as the reference value selection sample print 5225. The "/2/. Modification of Reference Value" operation 5220 is thus performed by inputting a reference value, corresponding to the thumbnail copy-forgery-inhibited pattern image presenting a minimum density difference, to the operation section 5221.

"/3/. Adjustment of Density of Latent Image" operation 5230 is performed by operating an operation section 5231. The density adjustment of the latent image is naturally accounted for in each of the sample prints 5215 and 5225.

During normal use, only "/1/. Selection of the Relative Value" operation 5210 is performed. If the variation width in the output density of the printer 1500 is large, "/2/. Modification of Reference Value" operation 5220 is also performed in addition to "/1/. Selection of the Relative Value" operation 5210. To further perform the density adjustment of the foreground/background, "/1/. Selection of Relative Value" operation 5210, "/2/ Modification of Reference Value" operation 5220, and "/3/. Adjustment of Density of Latent Image" operation 5230 are all carried out.

The structure of the operation section of the three operation levels has been discussed. The controls of the operation sections may be partially modified. The operation sections 5211, 5221, and 5231 may be arranged in a non-dialog format in a single page. Such modifications also fall within the scope of the present invention.

FIGS. 10-14 illustrate specific operation sections as a user interface for density calibration operation and sample prints. In the following discussion, parameter setting is as follows: a background density range from 0 to 64, a block width of 15, a reference value changing in steps of 4, an initial reference value 4, and an initial relative value of 0.

Figure 10:
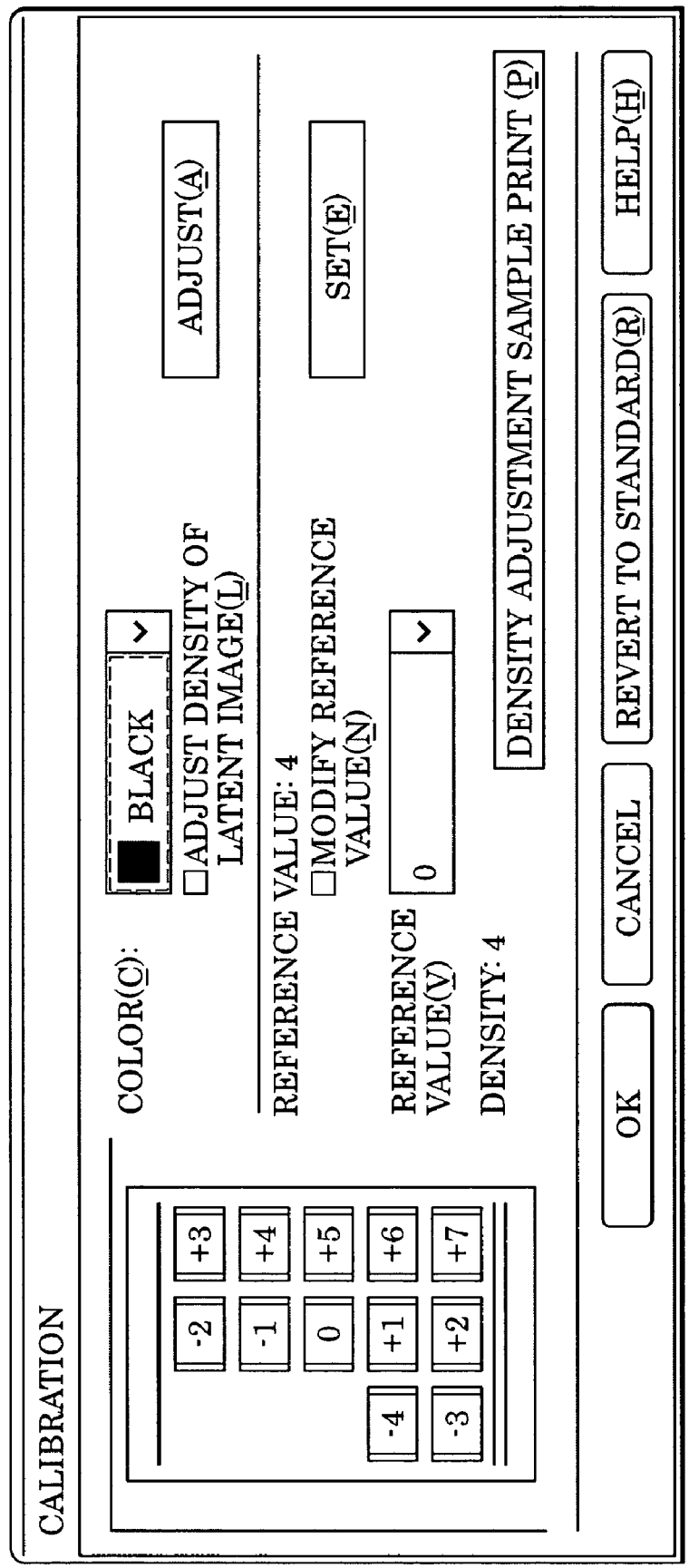
FIG. 10 illustrates a dialog for calibration of the density adjustment.
Figure 11:
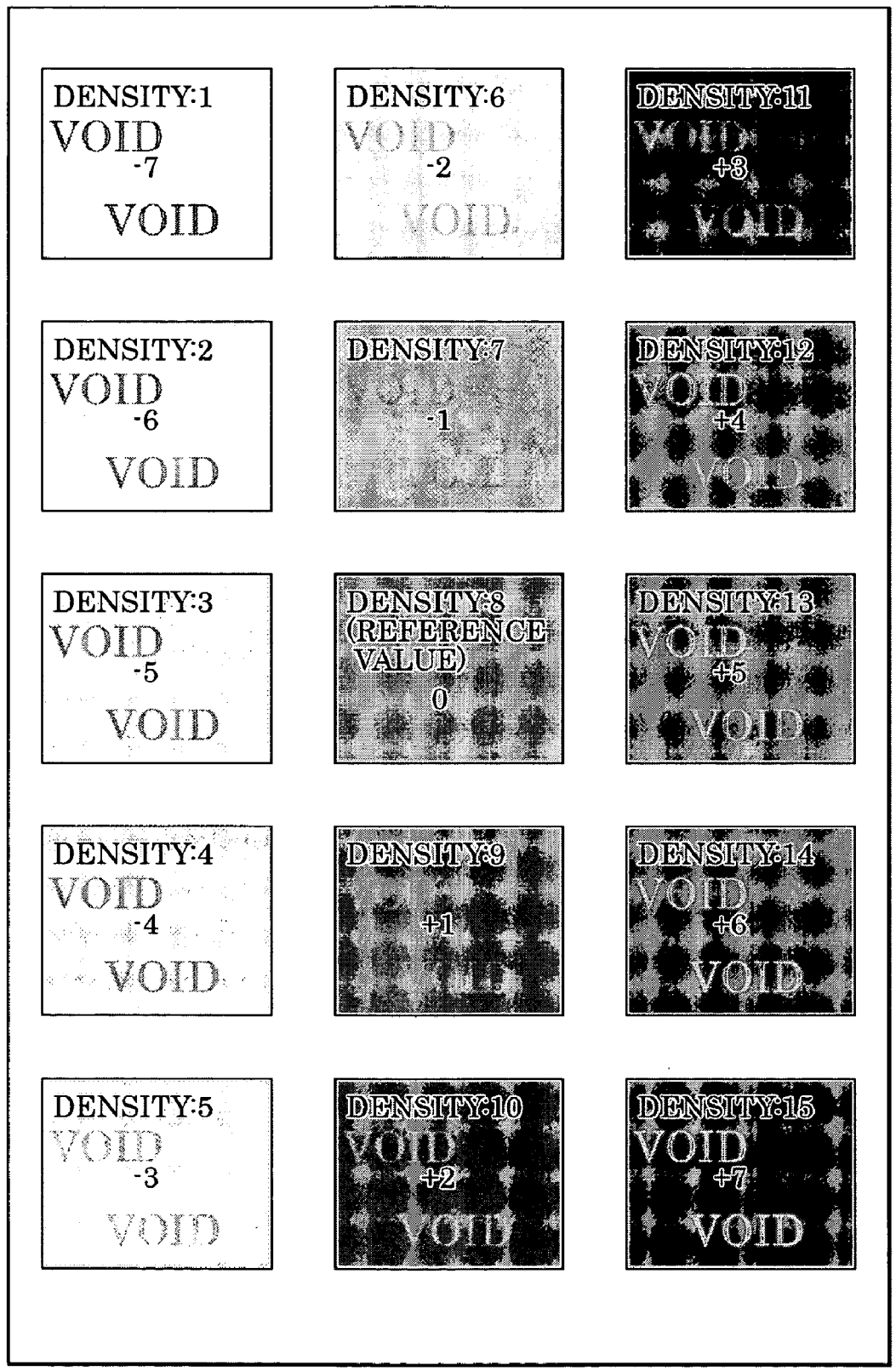
FIG. 11 illustrates density adjustment sample prints output at a relative value set for calibration.

FIG. 10 illustrates a "calibration" dialog screen. The calibration dialog screen is presented by selecting the calibration button 2106 of FIG. 4.

In the calibration dialog screen, the "Selection of the Relative Value" operation 5210 is performed. First, a "density adjustment sample print" button is selected. The printer 1500 to be density adjusted prints out a density adjustment sample print shown, such as the one shown in FIG. 11. As shown, thumbnail images respectively labeled relative values v of density ranging from −7 to +7 are printed. In the printed thumbnail images, the density of the background is changed stepwise with the density of the latent image fixed.

The thumbnail copy-forgery-inhibited pattern image in this sample print accounts for information set in the setting screen of FIG. 5 with the density of the background changed stepwise. The thumbnail image thus accounts for a background pattern, font, and the angle of a character string. In this way, the user visually checks the copy-forgery-inhibited pattern image that is going to be printed after density adjustment.

A thumbnail image having a relative value selected in the user interface of FIG. 10 can be outlined by a box so that the user can distinctly recognize the thumbnail image on the sample print.

Referencing the sample print, the user selects the relative value v of the thumbnail image with the latent image thereof most difficult to recognize with respect to the background density from a "relative value" dropdown list, and sets the selected relative value. The relative value of the sample print and the relative value printed on the sample print fall within a relative value range of ±7 with respect to the relative value (initial value zero) set during printing. The present invention imposes no particular requirement on the number of steps in the relative value range in each of a positive direction and a negative direction from the relative value.

In the dialog screen, "reference value" and "density" of the background are displayed in static text rather than in set values. The "density" value itself is not a setting item so that users do not need to memorize a density value that is variable in nature. The user is thus free from the difficulty reverting back to an earlier input density of the copy-forgery-inhibited pattern image when density adjustment is performed with respect to a memorized density value as a reference. A "color" list box is used to select color of an image to be calibrated. If the printer 1500 is of monochrome type, the word black is displayed. The color label may be grayed out to indicate that the color is not selectable.

A "set" button becomes active when a "modify reference value" check box is checked in the calibration dialog screen of FIG. 10. If the set button is selected, a "setting of reference value" dialog screen of FIG. 12 appears.

Figure 13:
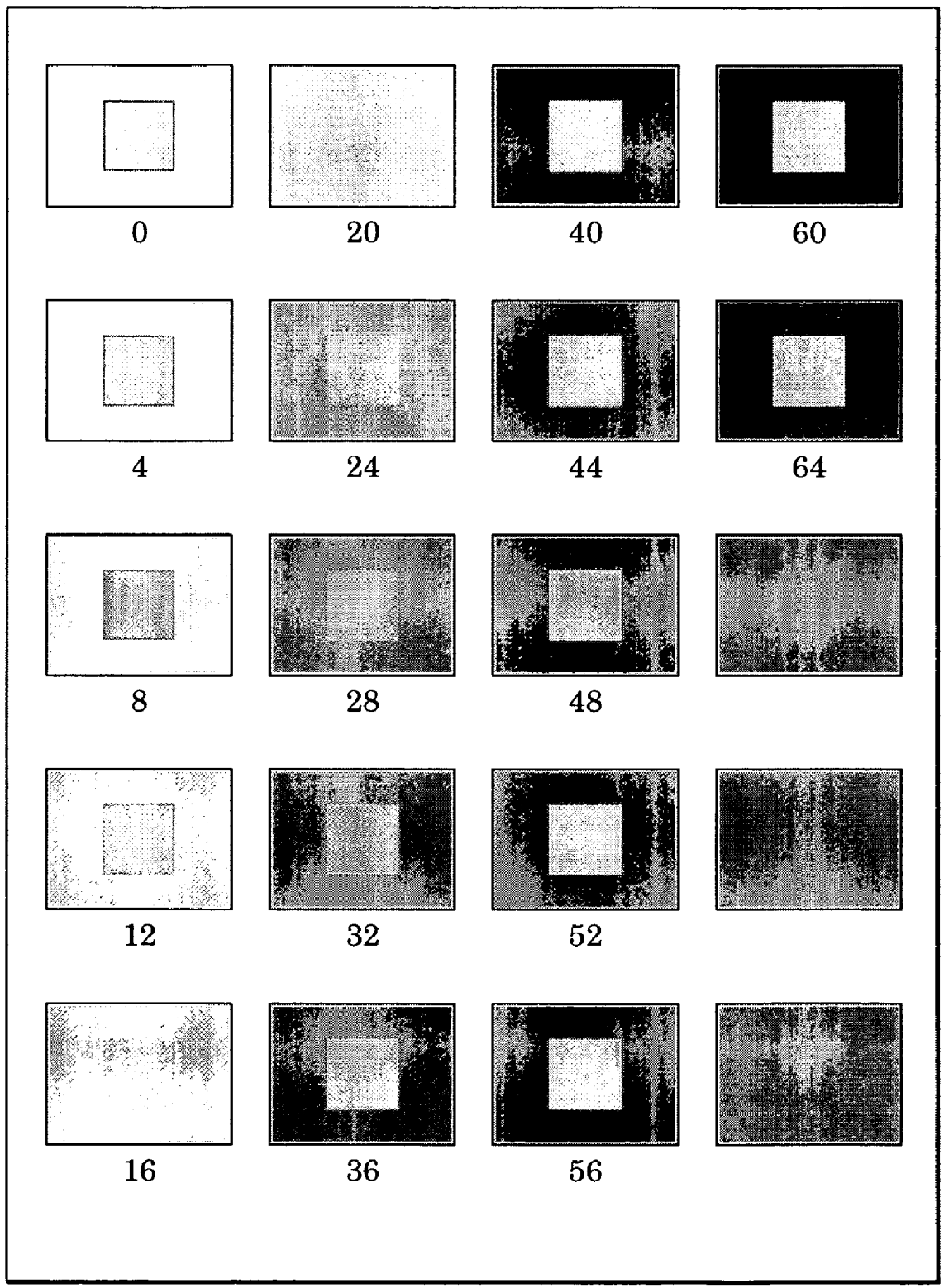
FIG. 13 illustrates a reference value sample printed out in the set reference value.

A reference value is set in the "setting of reference value" dialog screen. More specifically, when a "reference value sample print" box is selected, a reference value sample of FIG. 13 is printed. Thumbnails images with respective reference values in steps of 4 from 0 to 64 annotated thereon are printed as a sample print. The user determines the copy-forgery-inhibited pattern image providing the least density difference between the foreground and the background, and selects and sets the reference value on that thumbnail image as a "reference value".

The thumbnail images on the sample print are printed with the density of the latent image remaining constant and the density of the background changed in steps of 4. The reference value is set on this sample print. After setting the reference value, a sample print for setting a relative value is output again. The reference value setting sample print is used to roughly identify the relationship between the latent image density and the background density. In the output sample print, a rectangular latent image is surrounded by a background image having a different density. In this way, the user selects the background density (reference value) closest to the latent image density. The thumbnail image for setting the reference value accounts for no information set in the setting screen of FIG. 5 other than color.

A thumbnail image having a reference value selected in the user interface of FIG. 10 can be outlined by a box so that the user can distinctly recognize the thumbnail image on the sample print.

An "adjust" button becomes active if an "adjust density of latent image" check box is checked in the "calibration" dialog screen of FIG. 10. If the "adjust" button is selected, an "adjustment of density of latent image" dialog screen such as the one shown in FIG. 14 is displayed.

Figure 14:
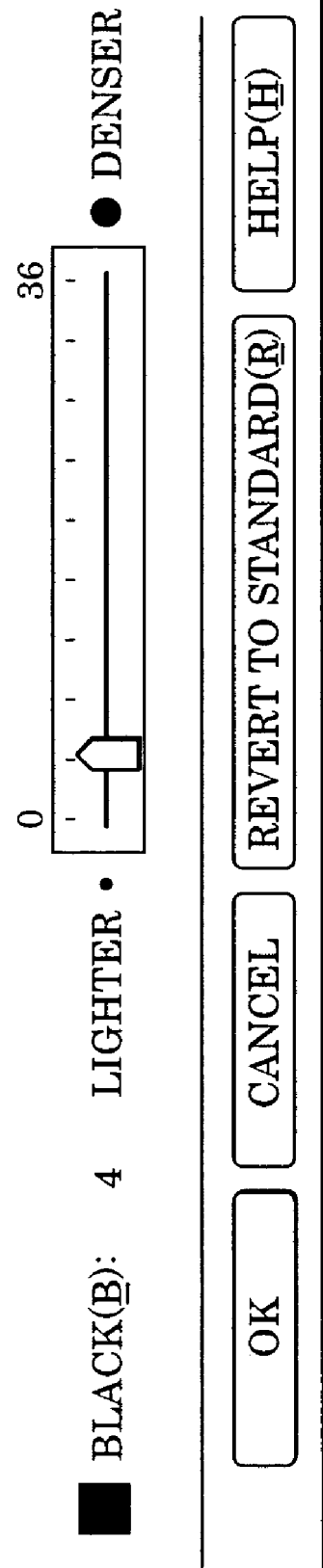
FIG. 14 illustrates a dialog screen for a density adjustment of the latent image portion.

As shown in FIG. 14, a slider is used to set the latent image density within a range from 0 through 36 in the adjustment of density of latent image dialog screen.

Figure 15:
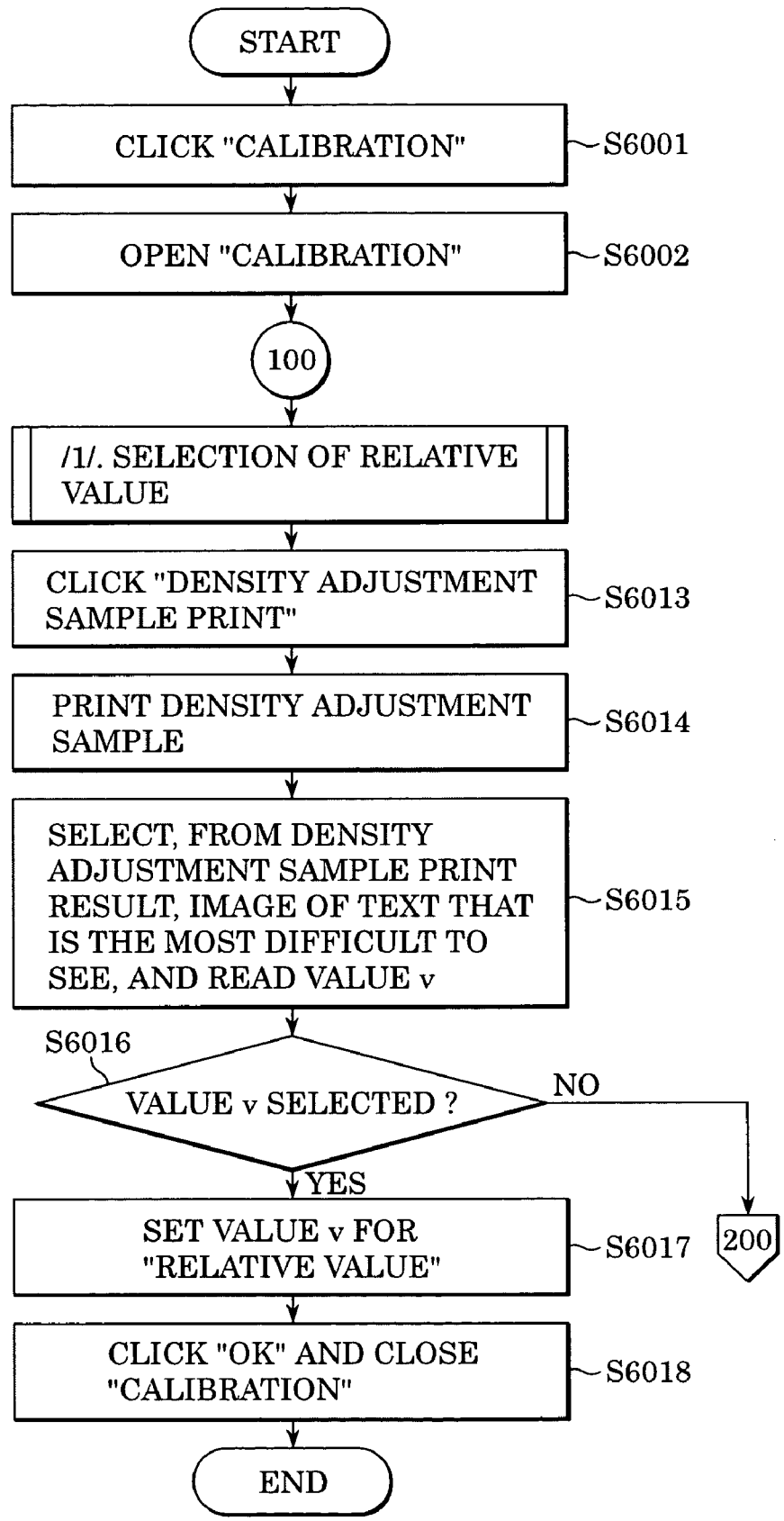
FIG. 15 is a flowchart of a standard density calibration operation in the density adjustment and the corresponding process of the computer.

FIG. 15 is a flowchart illustrating a user operation of the standard density calibration process and a corresponding process performed by a computer.

When the calibration button in the dialog screen of FIG. 4 is selected by the user in step S6001, the host computer 3000 detects the selection in step S6002 and shows the calibration dialog screen of FIG. 10.

When the user selects the "density adjustment sample print" box in the calibration dialog screen of FIG. 10 in step S6013, the host computer 3000 detects the selection in step S6014, and the printer 1500 to be calibrated prints the density adjustment sample. In step S6015, the user selects a thumbnail copy-forgery-inhibited pattern image with the latent image most difficult to recognize from the result of the density adjustment sample print, and reads the relative value v. If it is determined in step S6016 that the user completed the selection of an appropriate relative value v, processing proceeds to step S6017. If an appropriate thumbnail copy-forgery-inhibited pattern image cannot be selected, processing proceeds to step 200 of FIG. 16B to modify the reference value.

In step S6017, the user selects and sets the selected value v from the "relative value" dropdown list of FIG. 10. In response to the input of the relative value, the host computer 3000 acquires the relative value, and holds density information in the copy-forgery-inhibited pattern image printing.

In step S6018, the user selects an "OK" button of FIG. 10. In response, the host computer 3000 closes the "calibration" dialog screen.

Figure 16A:
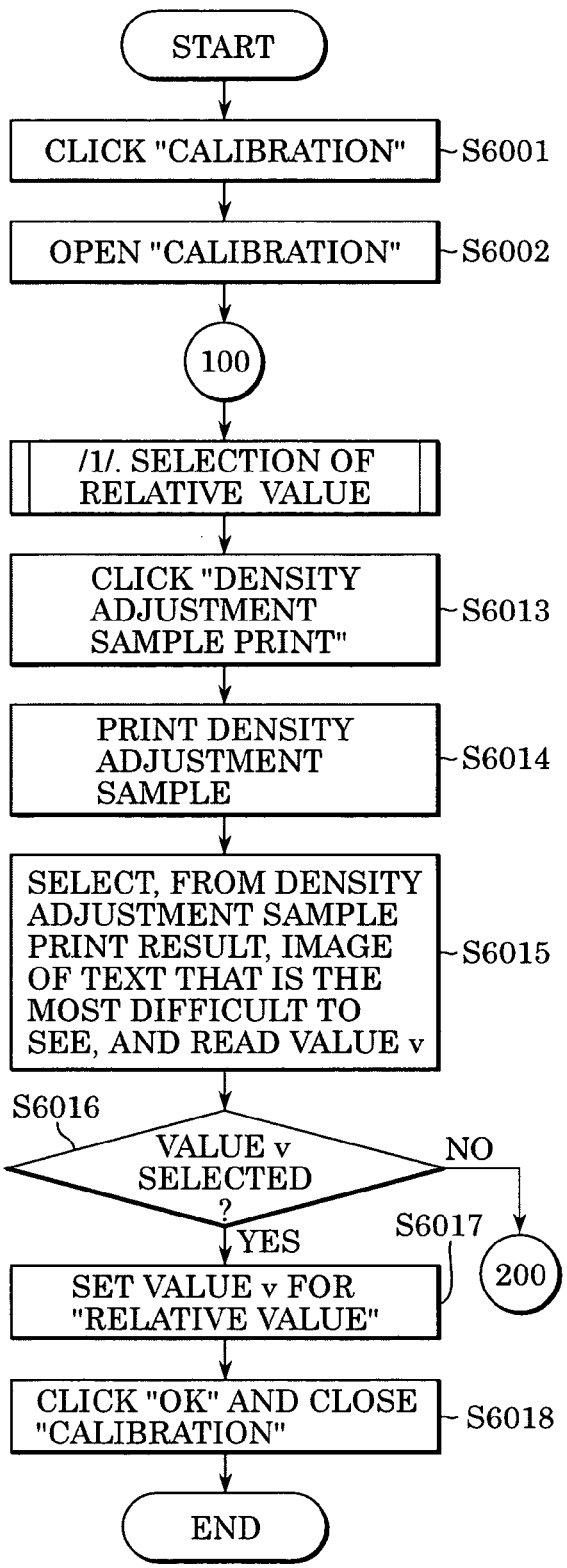
FIGS. 16A and 16B is a flowchart of an operation in the density adjustment during expansion of a variable width, and the corresponding process of the computer.
Figure 16B:
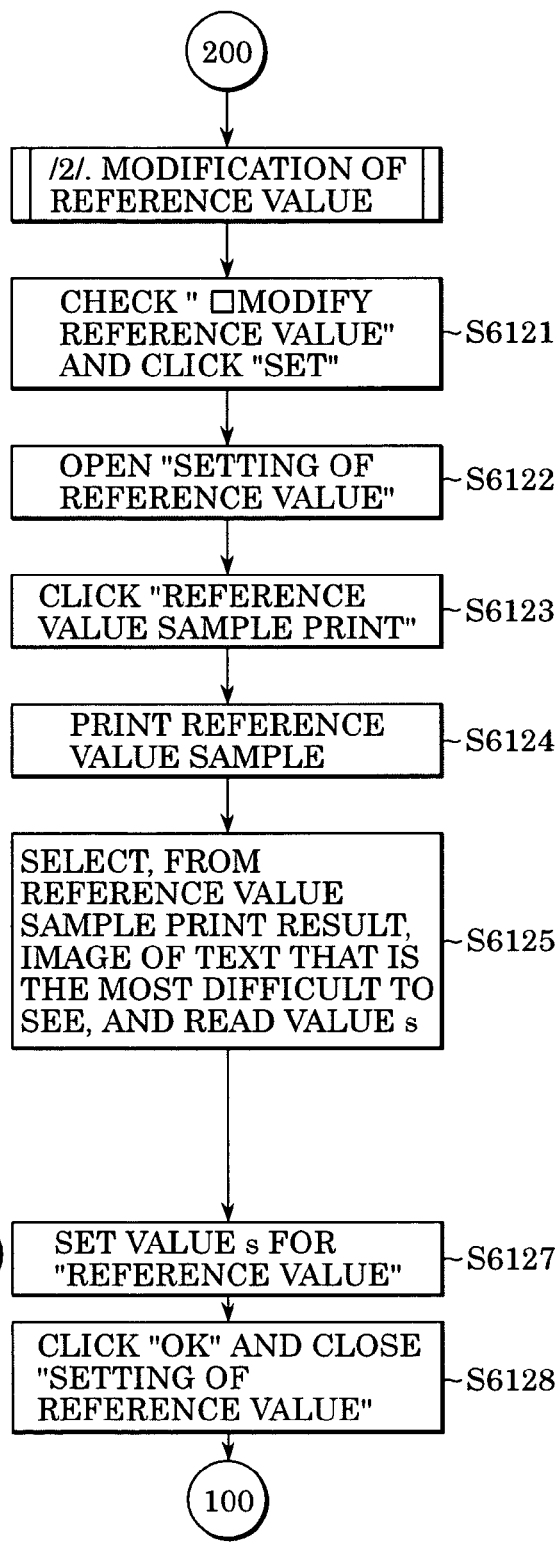

FIGS. 16A and 16B are flowcharts of user operation in the density correction process including the variation width expansion calibration range, and a corresponding process performed by the host computer 3000.

The reason why the relative value v of the thumbnail copy-forgery-inhibited pattern image having the latent image most difficult to recognize with respect to the background cannot be selected in step S6016 of FIG. 15 is that a variation of density is too wide for a value to be set within a range of relative value. Processing proceeds to step 200 to enter "Modification of Reference Value" operation.

In step S6121, the user checks the "modify reference value" check box in the calibration dialog screen of FIG. 10, and selects the "set" box. In response, the host computer 3000 presents the "setting of reference value" dialog screen of FIG. 12 in step S6122.

Figure 12:
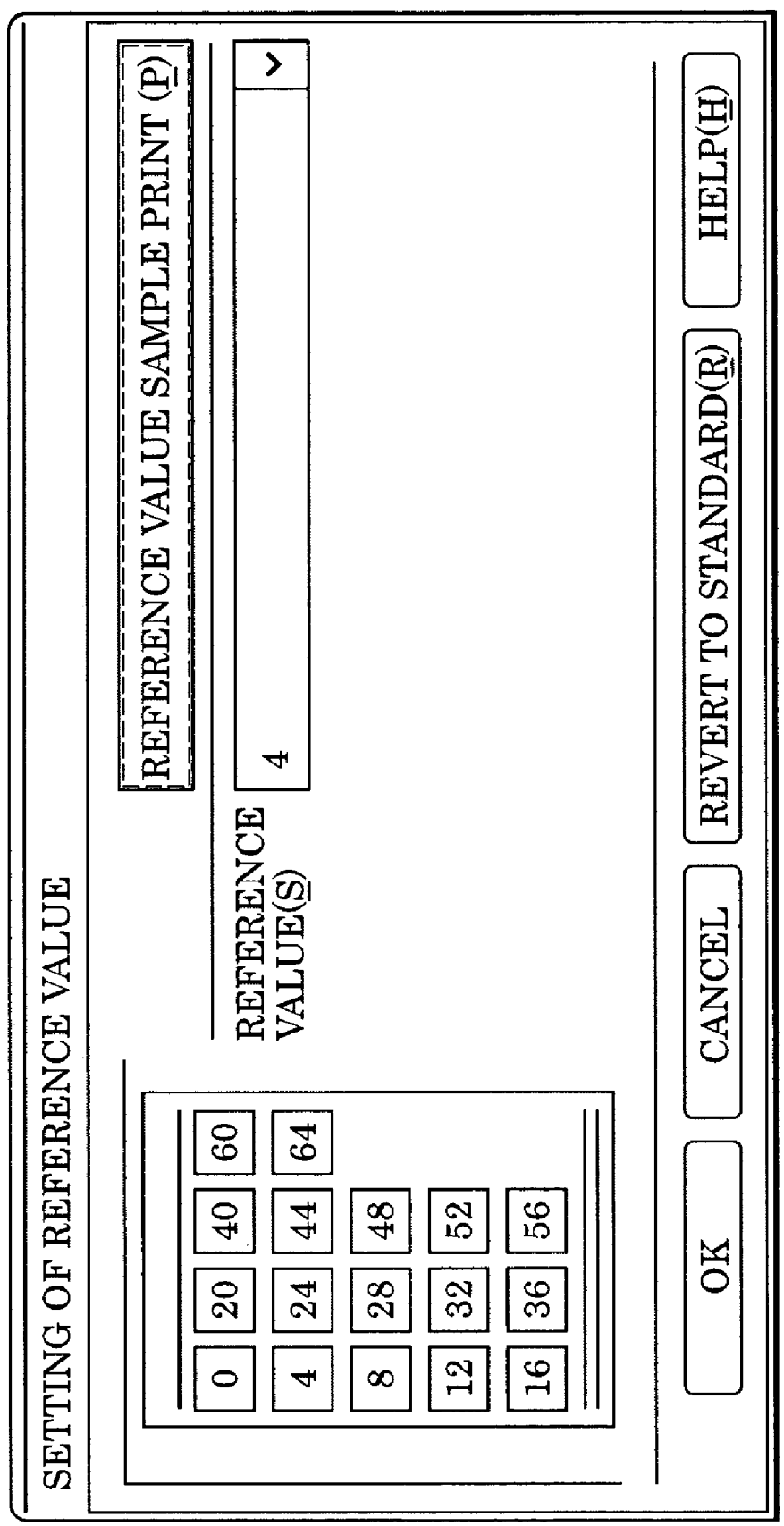
FIG. 12 illustrates a dialog screen in the setting of a reference value for density adjustment.

In step S6123, the user selects the "reference value sample print" box in the "setting of reference value" dialog of FIG. 12. In step S6124, the host computer 3000 instructs the printer 1500 to print the reference value sample. In step S6125, the user determines and selects the thumbnail copy-forgery-inhibited pattern image having the latent image most difficult to recognize from the reference value sample print result, and reads the reference value "as" of the thumbnail image. In step S6127, the user sets the reference value "s" for the "reference value". In response to the input of the reference value, the host computer 3000 acquires the reference value. In step S6128, the user selects an "OK" button, and the host computer 3000 closes the "setting of reference value" dialog screen. Processing returns to step 100, and under a new reference value, the user performs operations in the "Selection of the Relative Value" and the host computer 3000 performs corresponding processes.

Figure 17A:
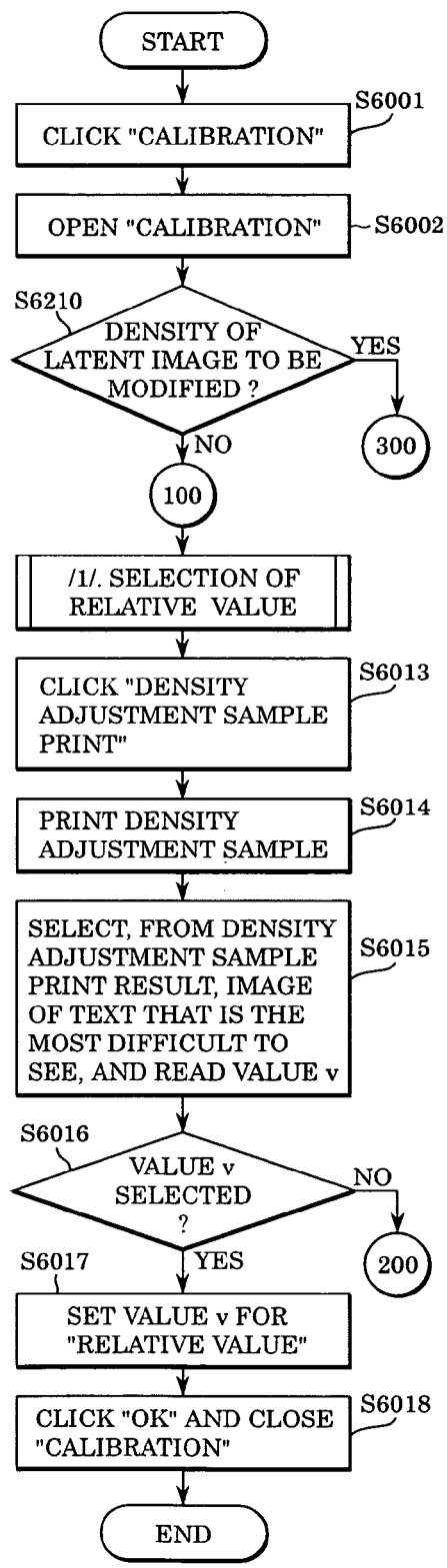
FIG. 17 is a flowchart of an operation during a fully controlled mode and the corresponding process of the computer.
Figure 17B:
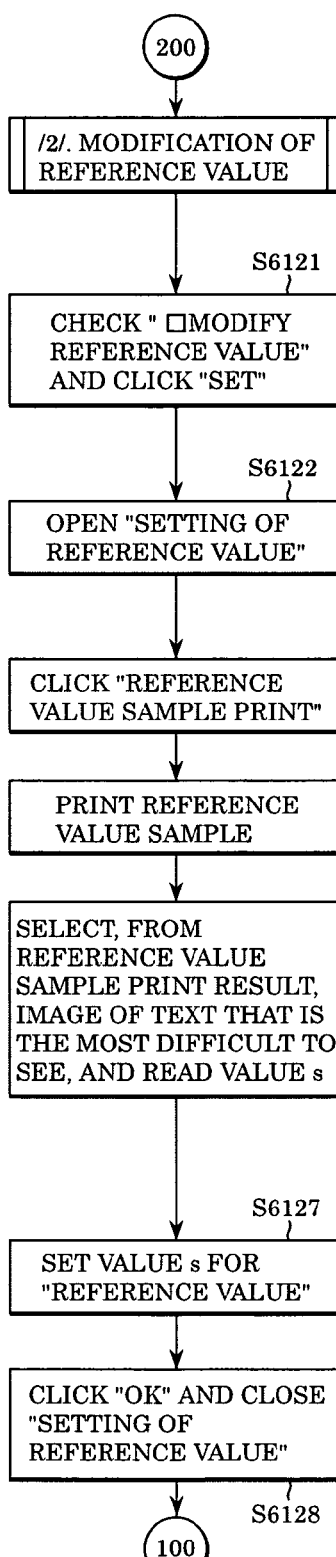
Figure 17C:
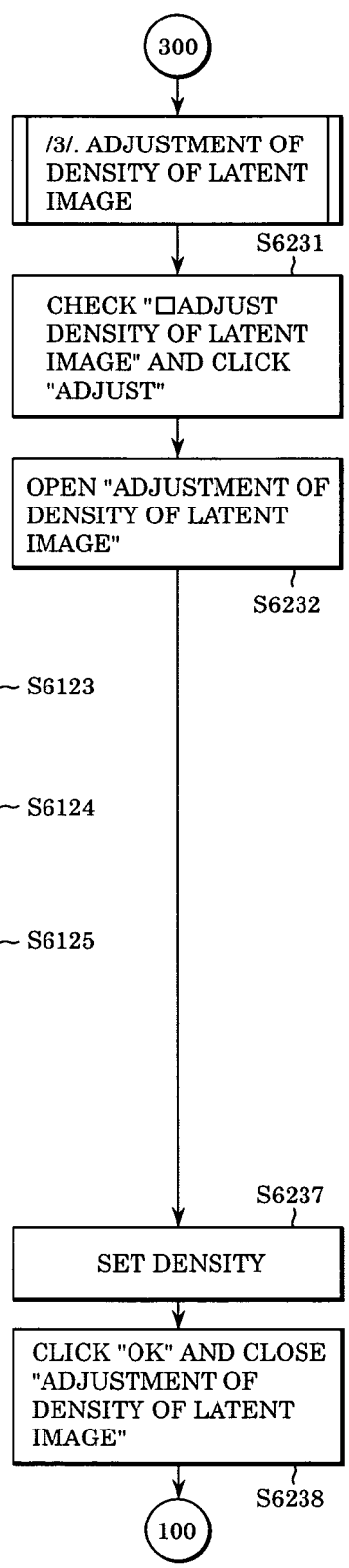
Figure 18:
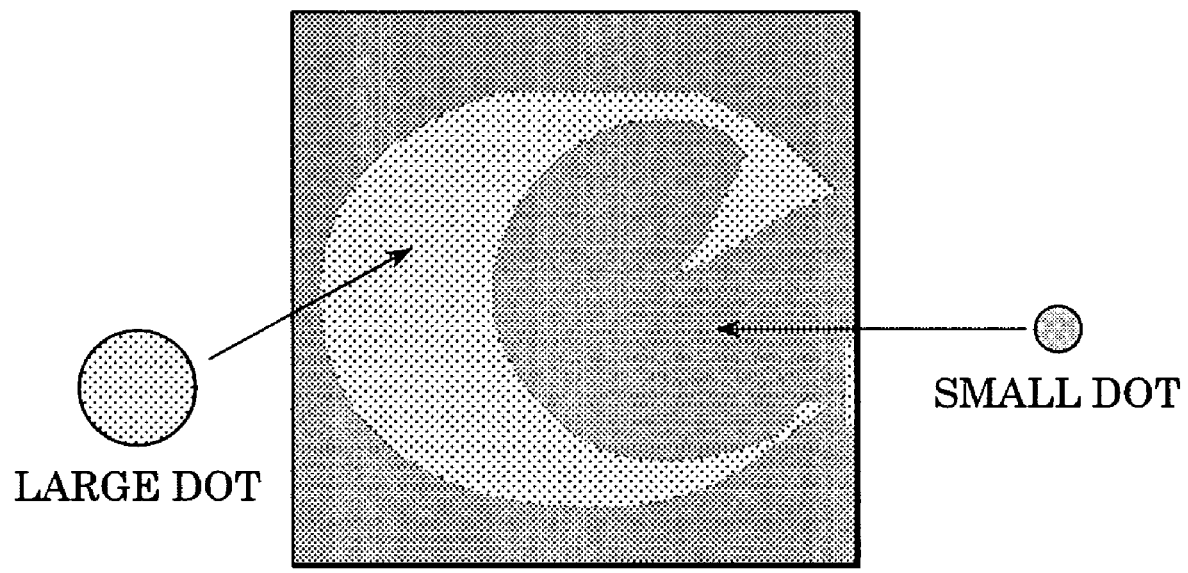
FIG. 18 illustrates two areas of the copy-forgery-inhibited pattern image, namely, the latent image portion and the background portion.
Figure 19:
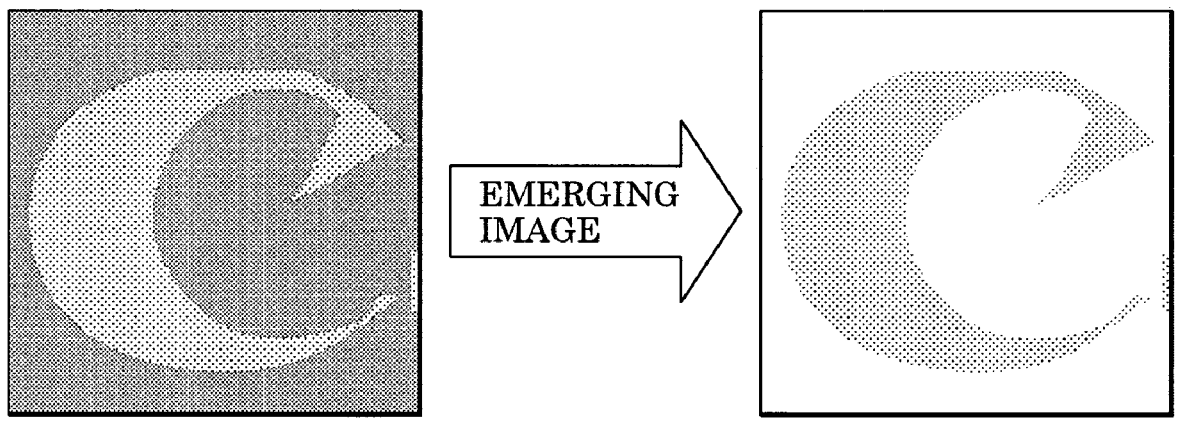
FIG. 19 illustrates an emerging image of the copy-forgery-inhibited pattern image.

FIGS. 17A-17C are flowcharts illustrating the user operation in the density calibration process for the fully controlled calibration range and a corresponding process performed by the host computer 3000.

When the host computer 3000 detects in step S6210 that the "adjust density of latent image" check box is checked, the host computer 3000 proceeds to step 300 although the description of such a step is omitted in the discussion of FIGS. 15 and FIGS. 16A and 16B.

In step S6231, the user checks the "adjust density of latent image" check box, and then selects the "adjust" box. In response, the host computer 3000 presents the "adjustment of density of latent image" dialog screen of FIG. 14 in step S6232. In step S6237, the user performs density setting operation. In response, the host computer 3000 acquires the input density of the latent image.

In step S6238, the user selects an "OK" button. In response, the host computer 3000 closes the "adjustment of density of latent image" dialog screen. Processing proceeds to step 100, and the "modification of reference value" operation and the "selection of relative value" operation are performed as necessary.

In the above-referenced density adjustment, the latent image portion and the background portion are set to look the same in density, in other words, the latent image is set to be most difficult to see with respect to the copy-forgery-inhibited pattern image. The density adjustment of the present invention is also applicable to achieving a constant relationship between a latent image portion and a background portion. For example, depending on the application of the copy-forgery-inhibited pattern image, only the density of the copy-forgery-inhibited pattern image can be intentionally increased with the background density set to zero so that the latent image stands out from the printed copy-forgery-inhibited pattern image. The density adjustment can be performed together with the outlined copy-forgery-inhibited pattern image style setting discussed with reference to FIG. 5. In this way, a character string of the latent image disappears when being copied.

The present invention is applicable to a system including a plurality of apparatuses (such as a computer, an interface device, a reader, and a printer) or a single apparatus (such as a copying apparatus, a printer, or a facsimile apparatus). In particular, when the copy-forgery-inhibited pattern image is produced on a copying apparatus or a printer, the setting process of the copy-forgery-inhibited pattern image, the calibration process, and the printing process can be performed by an image processor in the copying apparatus. The copying apparatus or the printer then functions as the image processing apparatus of the present invention.

A storage medium storing program code for performing the functions of the embodiments of the present invention can be installed in a system or an apparatus, and a computer (CPU or MPU (micro-processing unit)) of the system or the apparatus reads and executes the program code in the storage medium.

The program code read from the storage medium performs the functions of the foregoing exemplary embodiments of the present invention Examples of storage media for supplying the program code include a floppy disk, a hard disk, an optical disk, a magneto-optical disk, a CD-ROM, a CD-R (compact disk—recordable), a magnetic tape, a nonvolatile memory card, a ROM and the like.

By executing the program code read by the computer, the functions of the foregoing exemplary embodiment are performed. Furthermore, the operation system (OS) running on the computer performs partly or entirely a process in response to the instruction of the program code, and with the process performed, the functions of the above-referenced exemplary embodiment are performed.

The program code from the storage medium can be read into a memory incorporated in a feature expansion board in the computer or in a feature expansion unit connected to the computer. The CPU mounted on the feature expansion board or the feature expansion unit performs partly or entirely the actual process in response to the instruction from the program code. The functions of the above embodiments are executed through the process.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-016399 filed Jan. 23, 2004, and Japanese Patent Application No. 2004-329700 filed Nov. 12, 2004, which are hereby incorporated by reference herein.

What is claimed is:

1. A system for causing a printing unit to print out an image including a first portion and a second portion having smaller dots than the first portion, the system comprising:
   a first setting unit configured to set a density of the second portion,
   a first causing unit configured to cause the printing unit to print out a plurality of sample images in a sheet having the first portions of a same density and the second portions of different densities, wherein only one sample image whose second portion has the density set in the first setting unit is outlined so that a user can distinctly recognize which sample image has the density set in the first setting unit;
   a second setting unit configured to set a density of the second portion of the image based on a user selection of the sample image;

a third setting unit configured to:
(a) set a content, font family information, an inclination angle and a font size of a character string,
(b) set a printing order, and
(c) set which of the first portion and the second portion should have a shape of the character string;
a generating unit configured to generate the image including the first portion and the second portion whose densities have been set, with either the first portion or the second portion having the shape of the character string whose content, font family information, inclination angle and font size have been set;
a synthesizing unit configured to synthesize the generated image and a document image so that the generated image overlaps the document image when the printing order has been set as overlap printing and configured to synthesize the generated image and a document image so that the document image overlaps the generated image when the printing order has been set as watermark printing; and
a second causing unit configured to cause the printing unit to print out the synthesized image.

2. The system of claim 1 further comprising a controlling unit configured to display a screen including the sample images which are arranged in the same order with the sample images in the sheet.

3. A method for a printing system to cause a printing unit to print out an image including a first portion and a second portion having smaller dots than the first portion, the method comprising:
setting a density of the second portion;
causing, by a processor in the printing apparatus, the printing unit to print out a plurality of sample images in a sheet having the first portions of a same density and the second portions of different densities, wherein only one sample image whose second portion has the density set is outlined so that a used can distinctly recognize which sample image has the density;
setting a density of the second portion of the image based on a user selection of the sample image;
setting a content, font family information, an inclination angle and a font size of a character string;
setting a printing order;
setting which of the first portion and the second portion should have a shape of the character string based on a user instruction;
generating the image including the first portion and the second portion whose densities have been set, with either the first portion or the second portion having the shape of the character string whose content, font family information, inclination angle and font size have been set;
synthesizing the generated image and a document image so that the generated image overlaps the document image when the printing order has been set as overlap printing and synthesizing the generated image and a document image so that the document image overlaps the generated image when the printing order has been set as watermark printing; and
causing the printing unit to print out the synthesized image.

4. The method of claim 3 further comprising displaying a screen including the sample images which are arranged in the same order with the sample images in the sheet.

5. A computer-readable storage medium having stored thereon program code for performing a method by a printing system to cause a printing unit to print out an image including a first portion and a second portion having smaller dots than the first portion, the method comprising:
setting a density of the second portion;
causing, by a processor in the printing apparatus, the printing unit to print out a plurality of sample images in a sheet having the first portions of a same density and the second portions of different densities, wherein only one sample image whose second portion has the density set is outlined so that a user can distinctly recognize which sample image has the density;
setting a density of the second portion of the image based on a user selection of the sample image;
setting a content, font family information, an inclination angle and a font size of a character string;
setting a printing order;
setting which of the first portion and the second portion should have a shape of the character string based on a user instruction;
generating the image including the first portion and the second portion whose densities have been set, with either the first portion or the second portion having the shape of the character string whose content, font family information, inclination angle and font size have been set;
synthesizing the generated image and a document image so that the generated image overlaps the document image when the printing order has been set as overlap printing and synthesizing the generated image and a document image so that the document image overlaps the generated image when the printing order has been set as watermark printing; and
causing the printing unit to print out the synthesized image.

6. The computer-readable storage medium of claim 5 further comprising displaying a screen including the sample images which are arranged in the same order with the sample images in the sheet.

* * * * *